US012702988B2

(12) United States Patent
Erickson

(10) Patent No.: US 12,702,988 B2
(45) Date of Patent: Aug. 11, 2026

(54) SPRAY ASSEMBLY

(71) Applicant: Kohler Co., Kohler, WI (US)

(72) Inventor: Perry D. Erickson, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 18/885,062

(22) Filed: Sep. 13, 2024

(65) Prior Publication Data

US 2025/0001435 A1 Jan. 2, 2025

Related U.S. Application Data

(63) Continuation of application No. 17/377,006, filed on Jul. 15, 2021, now Pat. No. 12,090,495.

(60) Provisional application No. 63/209,789, filed on Jun. 11, 2021, provisional application No. 63/063,489, filed on Aug. 10, 2020.

(51) Int. Cl.

| | |
|---|---|
| ***B05B 1/16*** | (2006.01) |
| ***B05B 1/12*** | (2006.01) |
| ***B05B 1/30*** | (2006.01) |
| ***B05B 12/00*** | (2018.01) |

(52) U.S. Cl.

CPC .............. *B05B 1/1609* (2013.01); *B05B 1/12* (2013.01); *B05B 1/3013* (2013.01); *B05B 12/002* (2013.01)

(58) Field of Classification Search

CPC B05B 1/12; B05B 1/16; B05B 1/1609; B05B 1/1627; B05B 1/3033; B05B 1/304; B05B 1/3073; B05B 12/002

See application file for complete search history.

(56) References Cited

U.S. PATENT DOCUMENTS 4,117,979 A 10/1978 Lagarelli
5,839,666 A * 11/1998 Heimann ................ B05B 1/185 239/452
5,979,800 A 11/1999 Takagi
6,568,605 B1 * 5/2003 Chen ..................... B05B 1/3013 239/525
7,070,125 B2 7/2006 Williams et al.
(Continued)

FOREIGN PATENT DOCUMENTS

DE 10 2017 131 230 A1 6/2019
EP 3 181 765 A1 6/2017

OTHER PUBLICATIONS

Extended European Search Report on EP Appl. Ser. No. 21189517.2 dated Dec. 9, 2021 (9 pages).

*Primary Examiner* — Jason J Boeckmann

(74) *Attorney, Agent, or Firm* — Husch Blackwell LLP

(57) ABSTRACT

A spray assembly includes an inner chamber, an outer chamber, a spray face, a plurality of shafts, a lever, a moving fulcrum, and a plurality of sleeves. The inner chamber provides a fluid in a first spray mode of a plurality of spray modes. The spray face is fluidly coupled to the outer chamber and includes one or more nozzles that are movable between a plurality of nozzle positions such that the spray face provides the fluid in a second spray mode and a third spray mode. The plurality of shafts are movable for directing the fluid within the spray assembly. The lever operates the plurality of shafts. The moving fulcrum changes a location of a fulcrum of the lever such that the fulcrum changes as the lever is operated. A first sleeve is configured to move the one or more nozzles of the spray face.

20 Claims, 29 Drawing Sheets

(56) References Cited

U.S. PATENT DOCUMENTS

| | | | |
|---|---|---|---|
| 7,344,095 | B1 | 3/2008 | Hsu |
| 7,380,731 | B1 | 6/2008 | Hsu |
| 7,494,074 | B2 | 2/2009 | Benstead |
| 7,854,401 | B2 | 12/2010 | Malek |
| 7,909,269 | B2 | 3/2011 | Erickson et al. |
| 8,152,078 | B2 | 4/2012 | Jianglin et al. |
| 9,175,459 | B2 * | 11/2015 | Zhang ........................ E03C 1/02 |
| 9,233,379 | B2 | 1/2016 | Zhou et al. |
| 9,550,195 | B1 | 1/2017 | Cao et al. |
| 9,803,344 | B2 | 10/2017 | Carpenter-Crawford |
| 10,066,374 | B2 | 9/2018 | Wu et al. |
| 10,124,349 | B2 | 11/2018 | Erickson et al. |
| 2008/0060709 | A1 * | 3/2008 | Shieh .................... B05B 1/1609<br>137/801 |
| 2013/0239320 | A1 | 9/2013 | Aihara et al. |
| 2016/0160483 | A1 | 6/2016 | Wu |
| 2017/0183847 | A1 | 6/2017 | Ho |
| 2020/0376504 | A1 | 12/2020 | Yan et al. |
| 2021/0008580 | A1 | 1/2021 | Shi et al. |
| 2021/0062483 | A1 | 3/2021 | Yan et al. |

* cited by examiner

SPRAY ASSEMBLY

CROSS-REFERENCE TO RELATED PATENT APPLICATIONS

The present application is a continuation of U.S. application Ser. No. 17/377,006, filed Jul. 15, 2021, which claims the benefit and priority to U.S. Provisional Application No. 63/209,789, filed on Jun. 11, 2021 and U.S. Provisional Patent Application No. 63/063,489, filed on Aug. 10, 2020, all of which are incorporated herein in their entireties.

BACKGROUND

The present disclosure relates generally to spray assemblies. More specifically, the present disclosure relates to a hand-held spray assembly.

SUMMARY

At least one embodiment relates to a spray assembly configured to provide a fluid in a plurality of spray modes. The spray assembly includes a plurality of shafts, a spray face, a lever assembly, and a plurality of sleeves. Each of the plurality of shafts is configured to selectively provide the fluid to a fluid outlet of the spray assembly. The spray face includes one or more nozzles that are configured to be moved between a pluralities of positions such that the spray face selectively provides the fluid in the plurality of spray modes. The lever assembly includes a lever that is configured to be selectively operable in a plurality of positions. At least one of the plurality of sleeves is configured to be operable by the lever to move the one or more nozzles of the spray face.

Another embodiment relates to a method of assembling a spray assembly. The method includes providing a plurality of shafts and coupling a spray face to a first shaft of the plurality of shafts. The first shaft is configured to sealably couple to a second shaft of the plurality of shafts, where the first shaft and the second shaft are made of a polymeric material and form a polymer-polymer seal therebetween. The first shaft is also configured to couple to a third shaft of the plurality of shafts. The method also includes providing a plurality of sleeves, at least one of the sleeves configured to couple to one or more of the plurality of shafts. The method also includes providing a lever assembly that is configured to couple to one of the plurality of shafts.

A third embodiment relates to a spray assembly. The spray assembly includes a first shaft, a spray face coupled to the first shaft, a valve selectively coupled to the first shaft, and a first spring having a first spring constant and positioned between the first shaft and the valve. The spray assembly also includes a second shaft coupled to the first shaft and a second spring having a second spring constant and positioned between the first shaft and the second shaft. The spray assembly also includes a first sleeve coupled to the second shaft and a third spring having a third spring constant and positioned between the second shaft and the first sleeve. The spray assembly also includes a lever assembly coupled to and configured to selectively operate the first sleeve in a plurality of positions. The first sleeve is configured to selectively operate the spray face and the third spring. The third spring is configured to selectively operate the second shaft. The second shaft is configured to selectively operate the valve and the second spring. The valve is configured to selectively operate the first spring. The first spring, the second spring, and the third spring are each configured to provide different resistances to operating the lever assembly such that the first spring, the second spring, and the third spring provide tactile feedback to a user as the user operates the lever between the plurality of positions.

Another embodiment relates to a spray assembly configured to provide a fluid in a plurality of spray modes. The spray assembly includes a plurality of shafts, a spray face, a lever assembly, and a plurality of sleeves. Each of the plurality of shafts is configured to selectively provide the fluid to a fluid outlet of the spray assembly. The spray face includes one or more nozzles that are configured to be moved between a plurality of positions such that the spray face selectively provides the fluid in the plurality of spray modes. The lever assembly includes a lever that is configured to be selectively operable in a plurality of positions. The lever assembly is structured to operate each of the plurality of shafts when operated through the plurality of positions. The lever assembly is structured to include a moving fulcrum such that the fulcrum changes as the lever assembly is operated through the plurality of positions. At least one of the plurality of sleeves is configured to be operable by the lever assembly to move the one or more nozzles of the spray face.

This summary is illustrative only and should not be regarded as limiting.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
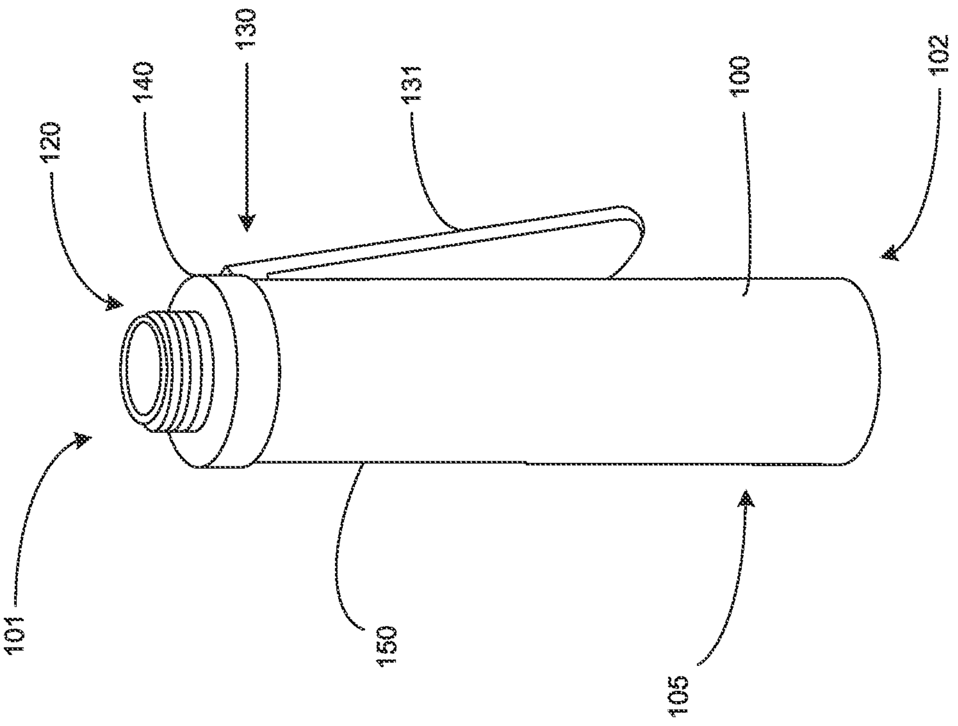
FIG. 1 is a perspective view of a spray assembly, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Traditional hand-held sprayers may be capable of providing different spray patterns (e.g., an aerate pattern, a shower pattern, a ring pattern, etc.). Most multi-mode sprayers, however, can be bulky and large to accommodate the various internal components required for switching between more than two spray modes (e.g., internal diverters, waterways, etc.). Slimmer, more compact sprayers may only be capable of providing two or less spray modes. Therefore, it would be advantageous to provide a hand-held sprayer that is capable of providing multiple spray modes (i.e., more than two) in a smaller or slimmer package that is more ergonomic and takes up less space, as compared to conventional multi-mode sprayers.

In addition, it would be advantageous to provide a hand-held sprayer that is easier to assemble and requires fewer parts, as compared to typical multi-mode hand-held sprayers.

Referring generally to the figures, a spray assembly 100 is shown according to an exemplary embodiment. The spray assembly 100 uses a lever 131 to rely on mechanical advantage to actuate a plurality of spray modes (e.g., three or more, etc.). The spray modes may include an aerate spray, a sweep spray, and a concentrated/stream spray, according to an exemplary embodiment. The internal structure includes various shafts/sleeves within a spray body 105 of the spray assembly 100 to direct the flow through different fluid passages.

The spray assembly 100 also includes a spray face 190 including dynamic spray nozzles that are capable of providing two or more spray modes. According to an exemplary embodiment, one or more spray nozzles of the spray face 190 may be manually moved directly or indirectly by the lever 131, so as to dynamically provide different spray patterns from the spray face 190. The spray nozzles may be made from an elastomeric material, and the spray assembly 100 may include an internal shaft coupled to the lever 131 that can selectively engage the spray nozzles to provide the dynamic movement. In this manner, the spray assembly 100 can, advantageously, provide for a plurality of spray modes using a smaller, or slimmer spray assembly design.

The spray assembly 100 may also include one or more springs for actuating a plurality of internal shafts. In some embodiments, each of the springs may have substantially equal spring constants. In other embodiments, two or more of the springs may have different spring constants. According to an exemplary embodiment, the spray assembly includes three springs, each having a different spring constant. In this arrangement, the springs are each configured to provide different resistances to actuating the lever 131, such that the springs provide tactile feedback to a user as the user actuates the lever 131 between the plurality of spray modes. In this way, the spray assembly 100 can provide for a more intuitive and user friendly experience.

The spray assembly 100 may also include internal shafts, sleeves, and valves configured to be selectively actuated by the lever 131 or the springs such that the shafts, sleeves, and valves facilitate the fluid flow in the spray assembly 100. The shafts, sleeves, and valves may be made of a polymeric material (e.g., plastic). In some embodiments, the shafts and sleeves may be coupled by a friction fit or snap-fit assembly. For example, a shaft may be snap-fit to another shaft, or a sleeve may be friction fit around a shaft. In other embodiments, the shafts, sleeves, and valves may be selectively and sealably coupled. In this arrangement, a first shaft may be sealably coupled to a second shaft where the seal between the first shaft and the second shaft is formed by a plastic-plastic seal such that the seal is formed substantially free of additional mechanical gaskets (e.g., without O-rings). This plastic-plastic seal advantageously allows for a smaller package spray assembly 100 because of the exclusion of mechanical gaskets. In some embodiments, the spray face 190 may include one or more plastic-plastic seals between the coupling of the shafts, sleeves, valves or any combination thereof. Additionally, the exclusion of mechanical gaskets reduces the steps involved in assembling the spray assembly 100.

Referring now to FIG. 1, a perspective view of the spray assembly 100 is shown according to an exemplary embodiment. The spray assembly 100 includes an outer sleeve 150 that extends at least partially between a sprayer first end 101 and a sprayer second end 102. The outer sleeve 150 contains various components of the spray assembly 100. In some embodiments, the outer sleeve 150 may be configured to have an ornamental exterior (e.g., brass, stainless steel, etc.). In additional embodiments, the ornamental exterior may be configured to match nearby fixtures in, for example, a kitchen environment. The spray assembly 100 may be incorporated as part of a faucet assembly, such as a pull-down faucet assembly in a kitchen, according to an exemplary embodiment. According to other exemplary embodiments, the spray assembly 100 may be a standalone sprayer. The spray assembly 100 may be used in a variety of different environments, including kitchens, bathrooms, showers, or other types of environments.

Still referring to FIG. 1, a lever assembly 130 is positioned at the sprayer first end 101. The lever assembly 130 includes a lever 131 that is disposed away from the outer sleeve 150. The lever 131 is an elongated member that is configured to be operable in a plurality of positions. As shown in FIG. 1, the lever is normally in a first position of the plurality of positions. An annular cover 140 is positioned atop the lever assembly 130. An inlet portion 120 extends upwards from the annular cover 140.

Referring now to FIGS. 2-16, cross section views and perspective views of various components of the spray assembly 100 are shown, according to an exemplary embodiment.

Figure 2:
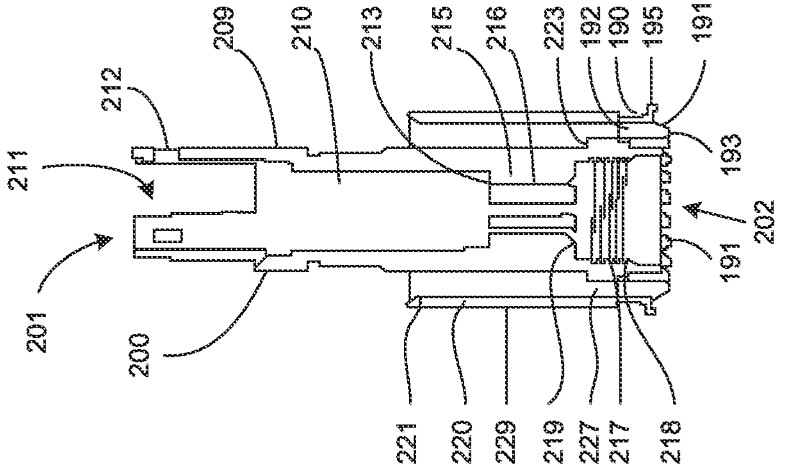
FIGS. 2-13 are cross section views of various components of the spray assembly of FIG. 1.

Referring now to FIG. 2, a spray face 190 is shown coupled to a first shaft 200. In some embodiments, the spray face 190 may be coupled to the first shaft 200 by a friction-fit coupling (e.g., press-fit/snap-fit). In other embodiments, the spray face 190 may be coupled to the first shaft 200 by an adhesive (e.g., glue, epoxy, etc.) or a fastener (e.g., bolt, pin, etc.) or over molded onto.

The spray face 190 may be made of a polymer or an elastic material (e.g., thermoplastic elastomer like Santoprene, silicone, etc.) or include portions that are made from an elastic material, such that at least a portion of the spray face 190 is selectively deformable (e.g., one or more spray nozzles, etc.). The spray face 190 is generally annular in shape and includes a plurality of nozzles 191 disposed about a perimeter of the spray face 190. Each of the nozzles 191 is configured to receive a fluid through an inlet 192 and provide the fluid via an outlet 193. The spray face 190 also includes an annular flange 195. The annular flange 195 is configured to operate the nozzles 191 in a plurality of positions. As shown, the nozzles 191 and the annular flange 195 are in a first position of a plurality of positions. In the first position, the nozzles 191 are configured to provide fluid in a first pattern (e.g., a sweep pattern). In a second position, the nozzles 191 are configured to provide fluid in a second pattern (e.g., a stream pattern). In some embodiments, when the nozzles are in positions between the first position and the second position, the nozzles 191 are configured to provide fluid in a pattern that is between the first pattern and the second pattern (e.g., a part-stream-part-sweep pattern).

According to an exemplary embodiment, the nozzles 191 may be configured to be pointed in generally the same direction such that each of the nozzles has a central axis that are each parallel to each other. In another exemplary embodiment, the nozzles may be configured to be pointed in a hyperbolic paraboloid pattern such that the nozzles provide a spray pattern that is non-circular.

According to an exemplary embodiment, the first shaft 200 is made of a polymeric material or combinations of materials (e.g., PBT or polybutylene terephthalate like Celenex). Additionally, the first shaft 200 is generally tubular in shape such that the first shaft 200 is substantially coaxial with the spray face 190. The first shaft 200 has a first end 201 and a second end 202. The first shaft 200 also has a first passage 210 defined by annular wall 209. The first passage 210 has an inlet portion 211 disposed at the first shaft first end 201, a central portion 215 disposed between the first shaft first end 201 and the first shaft second end 202, and an outlet portion 217 disposed at the first shaft second end 202. The first passage 210 is configured to receive fluid at or near the inlet portion 211 and provide fluid at or near the outlet portion 217.

The inlet portion 211 includes a coupling portion 212. The inlet portion 211 also includes a radial ledge 213 that is positioned between the inlet portion 211 and the central portion 215. The thickness of the annular wall 209 at the inlet portion 211 is less than the thickness of the annular wall 209 at the central portion 215 such that the passage 210 is wider at the inlet portion 211 and narrower at the central portion 215.

The central portion 215 includes a plurality of grooves 216. The central portion 215 has a radial lip 219 that is positioned between the central portion 215 and the outlet portion 217. The thickness of the annular wall 209 at the central portion 215 is greater than the thickness of the annular wall 209 at the outlet portion 217 such that the passage 210 is wider at the outlet portion 217 and narrower at the central portion 215.

The annular wall 209 includes a threaded portion 218 at the outlet portion 217. The threaded portion 218 is shown to be configured as a female threaded portion, but in other embodiments, the threaded portion may be configured as a male threaded portion.

The first shaft 200 also includes a second passage 220. The second passage 220 is generally annular in shape and is defined by annular wall 229 and annular wall 209 such that the second passage is substantially coaxial with the first passage 210. The second passage 220 includes an inlet portion 221 and an outlet portion 227. The inlet portion 221 of the second passage 220 is configured to receive fluid. The annular wall 229 has a substantially uniform thickness such that the outer diameter of the second passage 220 is substantially constant. The annular wall 209 extends further radially outward at the outlet portion 227 of the second passage 220 such that the thickness of the second passage 220 at the outlet portion 227 is less than the thickness of the second passage 220 at the inlet portion 221. A radial ledge 223 is positioned between the inlet portion 221 and the outlet portion 227. The outlet portion 227 is configured to provide fluid to the spray face 190.

Figure 3:
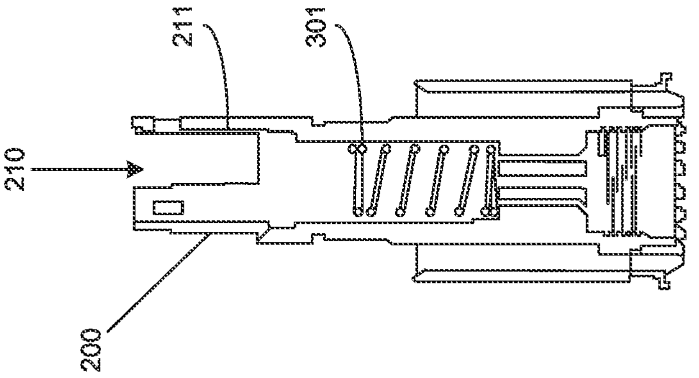

Referring to FIG. 3, a first spring 301 is shown positioned in the inlet portion 211 of the first passage 210 of the first shaft 200. The first spring 301 is configured to engage and be selectively compressed against the radial ledge 213. The first spring 301 is configured to have a first spring constant "$k_1$".

Figure 4:
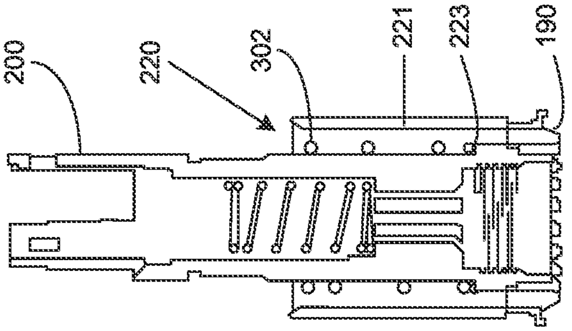
Figure 5:
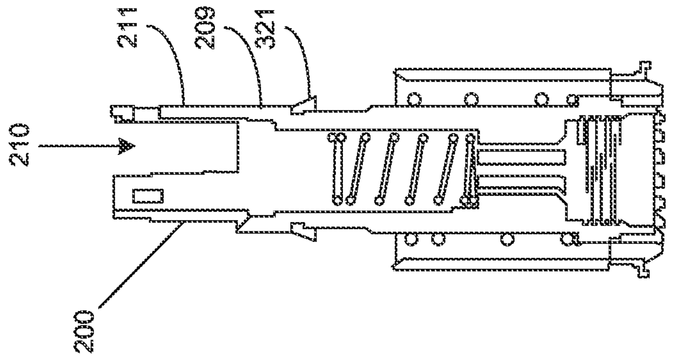

Referring to FIG. 4, a second spring 302 is shown positioned in the inlet portion 221 of the second passage 220 of the first shaft 200. The second spring 302 is configured to engage with and be selectively compressed against the radial ledge 223. The second spring 302 is configured to have a second spring constant "$k_2$". According to an exemplary embodiment, the first spring constant $k_1$ is less than the second spring constant $k_2$. For example, the first spring constant $k_1$ may be about 963 N/m (5.5 lbf/in.)+/−25% and the second spring constant $k_2$ may be about 10 N/m (10 lbf/in)+/−25%. In this arrangement, the first spring 301 and the second spring 302 may be actuated concurrently (e.g., experience an equal applied force) resulting in a greater deflection (e.g., compression) in the first spring 301 and a lesser deflection in the second spring 302. In some embodiments, the first spring constant ki is substantially less than the second spring 302 constant b such that the first spring 301 may be fully compressed while the second spring 302 is only partially compressed. Referring to FIG. 5, a sealing flange 321 is shown coupled to an outer portion of the annular wall 209. According to an exemplary embodiment, the sealing flange 321 is made of EPDM (ethylene propylene diene monomer) rubber. The sealing flange 321 is configured to sealably couple to at least the outer portion of the annular wall 209.

Figure 6:
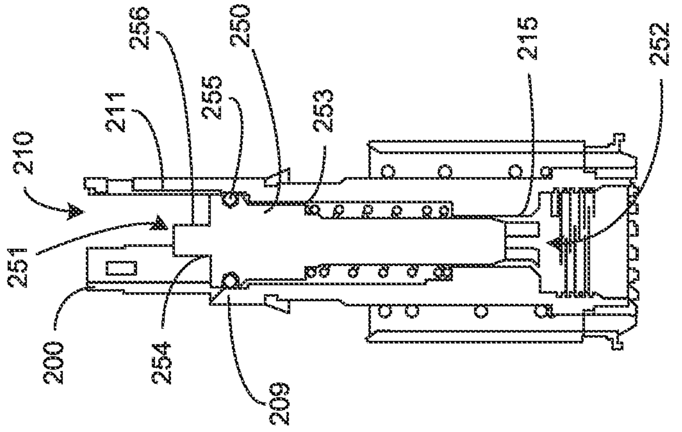

Now referring to FIG. 6, a valve shaft 250 is shown disposed within the first passage 210 of the first shaft 200. In some embodiments, the valve shaft 250 is made of a Polyoxymethylene (POM), also known as acetal material. Additionally, the valve shaft 250 is generally cylindrical in shape. The valve shaft 250 has a first end 251 and a second end 252 opposite the first end 251. The first end includes an extended portion 256 that defines an annular ledge 254. The first end 251 has a greater diameter than the second end 252 such that a radial ledge 253 is positioned between the first end 251 and the second end 252. The first spring 301 is configured to engage with and be compressed against the radial ledge 253. The plurality of grooves 216 are configured to receive the second end 252 of the valve shaft 250.

A scaling ring 255 (e.g., O-ring) is configured to couple to an exterior portion of the first end 251 of the valve shaft 250 and selectively engage with an interior portion of the annular wall 209 near the inlet portion 211 of the first shaft 200. When the sealing ring 255 engages with the inlet portion 211, the sealing ring 255 forms a fluid-tight seal between the first shaft 200 and the valve shaft 250 such that fluid is prevented from flowing through the first passage 210.

Figure 7:
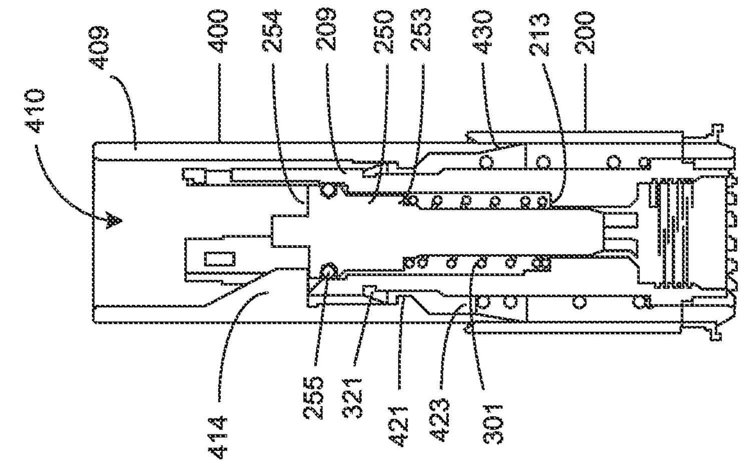

Now referring to FIG. 7, a second shaft 400 is shown positioned atop the first shaft 200. In some embodiments, the second shaft 400 is made of a polymeric material. Additionally, the second shaft 400 is generally tubular in shape. The second shaft 400 has a first passage 410 defined by annular wall 409. The second shaft 400 includes at least one flange 414 that is disposed radially inward from the annular wall 409.

The flange 414 is configured to selectively engage with the annular ledge 254 of the valve shaft 250 such that when the flange 414 engages the annular ledge 254, the valve shaft 250 is actuated axially downwards and the first spring 301 is compressed between the radial ledge 213 of the first shaft 200 and the radial ledge 253 of the valve shaft 250. When the valve shaft 250 is actuated in this manner, the sealing ring 255 is configured to engage the first shaft 200 as described above.

The second shaft 400 also includes an annular scaling flange 421 that is disposed radially inward from the annular wall 409. The annular sealing flange 421 is configured to selectively engage the sealing flange 321. When the sealing flange 421 engages with the sealing flange 321 a fluid-tight seal is formed between the annular wall 209 of the first shaft 200 and the annular wall 409 of the second shaft 400 thereby prevented fluid from flowing from the first passage 410 of the second shaft 400 to the second passage 220 of the first shaft 200.

The second shaft 400 also includes an annular shelf 423 that extends radially inward from the annular wall 409 and is disposed axially below the annular sealing flange 421. The annular shelf 423 is configured to engage with the second spring 302 such that the second spring 302 may be selectively compressed between the annular shelf 423 and the radial ledge 223. When the second shaft 400 is actuated axially downward, the annular shelf 423 compresses the second spring 302 with the radial ledge 223.

The first passage 410 of the second shaft 400 is configured to receive fluid and selectively provide fluid to the first passage 210 of the first shaft 200 or the second passage 220 of the first shaft 200, depending on the selected spray mode. According to an exemplary embodiment, in a first position (i.e., a normally open position), the flange 414 is engaged with the annular ledge 254 such that fluid may flow from the first passage 410 of the second shaft to the first passage 210 of the first shaft 200. Also in the first position, the annular sealing flange 421 is engaged with the sealing flange 321 such that fluid may not flow from the first passage 410 of the second shaft 400 to the second passage 220 of the first shaft 200. In a second position, annular sealing flange 421 is not engaged with the sealing flange 321 such that fluid may flow from the first passage 410 of the second shaft 400 to the second passage 220 of the first shaft 200. Furthermore, the annular shelf 423 engages with and compresses the spring 302 into the radial ledge 223.

The second shaft 400 also includes a tapered sealing flange 430. The tapered scaling flange extends axially downward form the annular wall 409 and is configured to engage with the first shaft 200. The engagement between the tapered sealing flange 430 and the first shaft 200 forms a fluid-tight polymer-polymer seal (e.g., plastic-plastic seal). This polymer-polymer seal advantageously does not include an additional sealing member or mechanical gasket (e.g., 0-ring, gasket, etc.) such that the slim body design of the spray assembly 100 is maintained.

Figure 8:
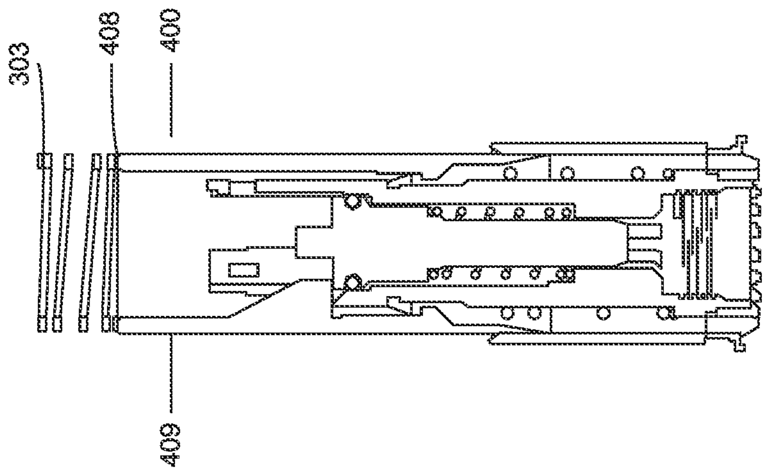

Referring to FIG. 8, a third spring 303 is shown positioned axially above the second shaft 400. The third spring 303 is configured to engage and be selectively compressed against a top portion 408 of the annular wall 409 of the second shaft 400. The third spring 303 is configured to have a third spring constant "b". In some embodiments, the third spring constant b is greater than the second spring constant b. For example, the third spring constant may be about 3502 N/m (20 lbf/in.)+/−25%. In this arrangement, the first spring 301, the second spring 302, and the third spring 303 may be simultaneously actuated (e.g., experience an equal applied force), the second spring 302 deflects less than the first spring 301, and the third spring 303 deflects less than the second spring 302. In some embodiments, the first spring constant ki and the second spring constant bare substantially less than the third spring constant b such that the first spring 301 and the second spring 302 may be fully compressed while the third spring 303 is only partially compressed.

Figure 9:
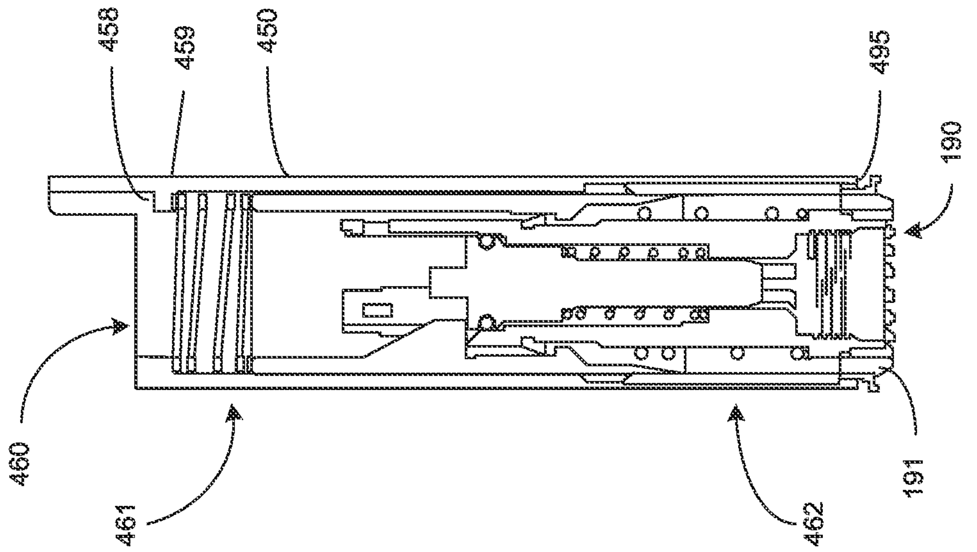

Referring to FIG. 9, an inner sleeve 450 is shown positioned atop the third spring 303, according to an exemplary embodiment. According to an exemplary embodiment, the inner sleeve 450 is made of a polymeric material. The inner sleeve 450 is generally tubular in shape and includes a central opening 460 defined by an annular wall 459. The central opening 460 is at least partially radially outward from the first shaft 200, the valve shaft 250, and the second shaft 400.

The inner sleeve 450 also includes an annular lip 458 that extends radially inward from annular wall 459. The annular lip 458 is configured to engage with the third spring 303 such that the third spring 303 is selectively compressible between the annular lip 458 and the top portion 408 of the second shaft 400.

The annular wall 459 has a proximal end 461 and a distal end 462. The proximal end 461 is shown as having the same outer diameter as the distal end 462. The proximal end 461 has a greater wall thickness than the distal end 462 such that the central opening 460 is wider at the distal end 462 and narrower at the proximal end 461.

The annular wall 459 also has an end portion 495 disposed at the distal portion 462. The end portion 495 is configured to selectively engage with the annular flange 195 of the spray face 190. For example, when the inner sleeve 450 is in a first position, the end portion 495 may not engage with the annular flange 195 such that the annular flange is in a first position. When the inner sleeve 450 is in a second position, the end portion may engage with the annular flange 195 such that the end portion 495 operates the annular flange 195 from the first position to a second position. As the annular flange 495 is operated from the first position to the second position, the nozzles are operated through a plurality of positions, as described above.

According to an exemplary embodiment, the annular flange 495 may have a generally hyperbolic paraboloid shape such that each of the nozzles 191 are operated at different angles. In this arrangement, the nozzles 191 may have an original (e.g., un-operated) shape that is also generally hyperbolic paraboloidal in shape. According to an additional exemplary embodiment, the annular flange 495 may have a generally circular shape such that each of the nozzles 191 are operated uniformly. In this arrangement, the nozzles 191 may have an original shape that is also generally circular.

Figure 10:
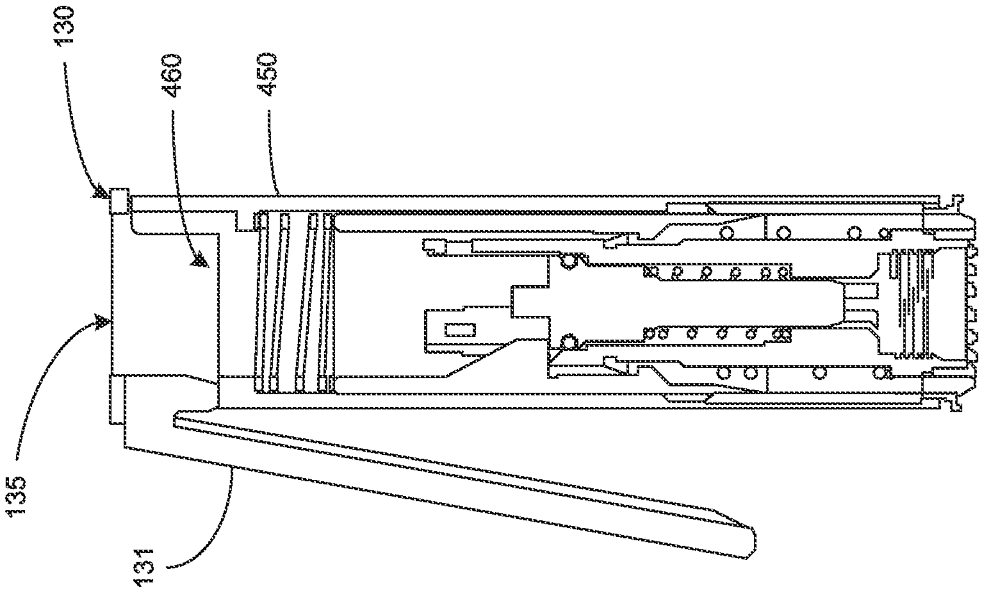

Referring to FIG. 10, a lever assembly 130 is show positioned atop the inner sleeve 450. The lever assembly 130 includes a lever 131 and a central opening 135. The lever is configured to be operable in a plurality of positions. As shown, the lever 131 is in a first position (e.g., a normally open position).

Figure 11:
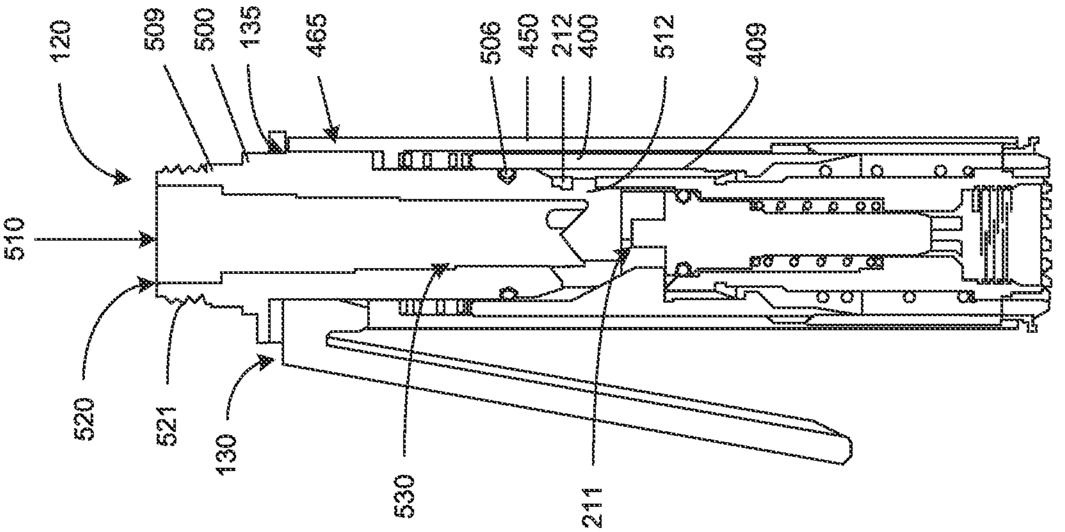

Referring to FIG. 11, a fourth shaft 500 is shown positioned atop the lever assembly 130 and extends through the central opening 135 of the lever assembly 130 and the central opening 460 of the inner sleeve 450 towards the inlet portion 211 of the first shaft 200. The fourth shaft 500 is generally tubular in shape. In some embodiments, the fourth shaft is made of a polymeric material.

The fourth shaft 500 includes a first passage 510 defined by an annular wall 509. The annular wall 509 has inlet portion 520 (also shown as inlet portion 120). According to an exemplary embodiment, the inlet portion 520 has external male threads 521. The male threads 521 are configured to be selectively coupled to a fluid supply (e.g., a household water supply) such that a fluid may flow into the first passage 510. In other embodiments, the fourth shaft 500 may include an alternative coupling device such as female threads or a clip style retention device configured to selectively couple the fourth shaft 500 to the fluid supply. The inlet portion 520 is opposite an outlet portion 530.

The outlet portion 530 of the annular wall 509 includes a coupling portion 512. The coupling portion 512 is configured to couple to the coupling portion 212 of the first shaft 200. For example, the coupling portion 512 of the fourth shaft 500 may couple to the coupling portion 212 of the first shaft 200 by a friction-fit (e.g., snap-fit) arrangement.

The outlet portion 530 may also include a mechanical gasket 506 (e.g., O-ring) disposed on an exterior surface of the annular wall 509. The mechanical gasket 506 may engage with the exterior surface of the annular wall 509 and an interior surface of the annular wall 409 such that a fluid-tight seal is formed between the second shaft 400 and the fourth shaft 500.

Figure 12:
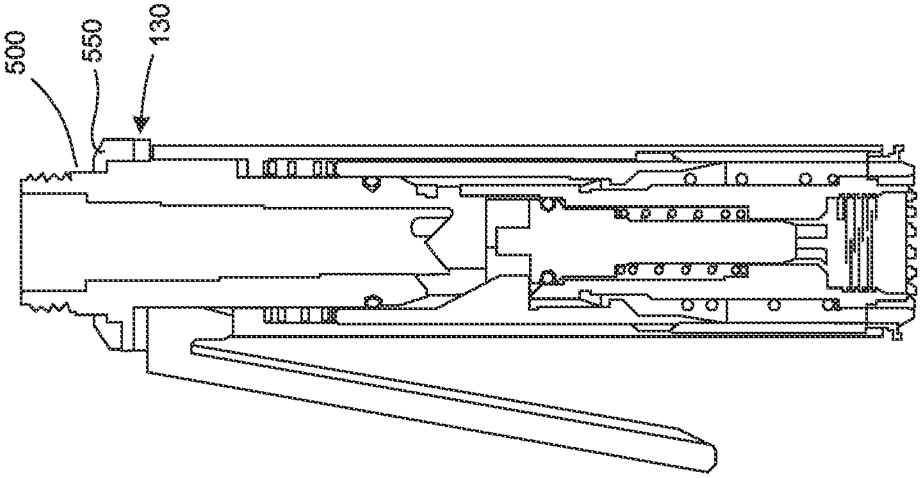
Figure 13:
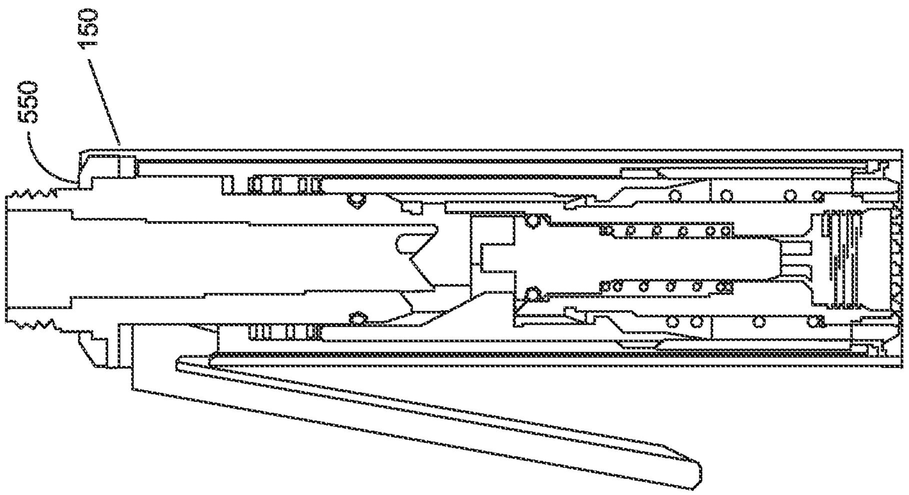
Figure 14:
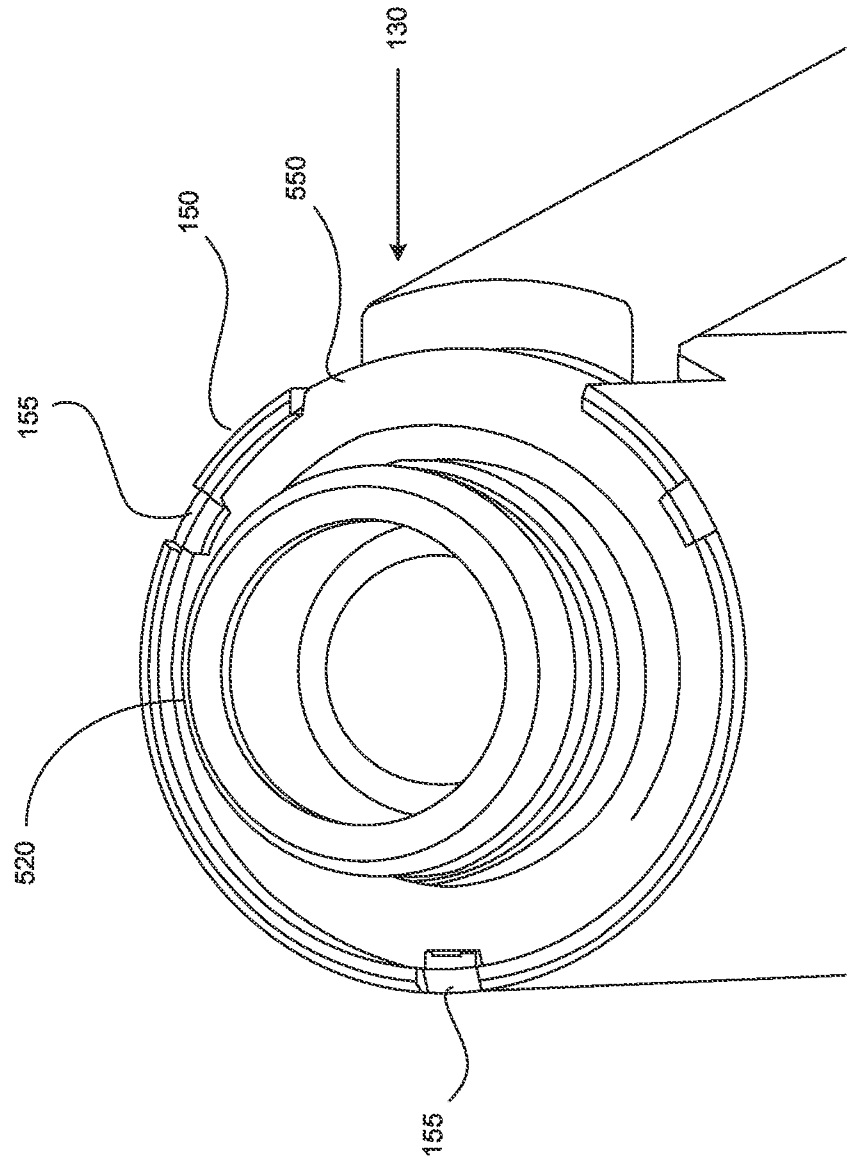
FIG. 14 is a detailed perspective view of an interior portion of the spray assembly of FIG. 1.

Referring to FIGS. 12-14, an annular cap 550 is shown positioned at least partially atop the fourth shaft 500 and the lever assembly 130. The annular cap 550 may be coupled to the fourth shaft 500 and the lever assembly 130. An outer sleeve 150 is positioned at least partially atop the annular cap 550. The outer sleeve 150 is configured to at least partially surround the first shaft 200, the valve shaft 250, the second shaft 400, the inner sleeve 450, and the fourth shaft 500. The outer sleeve 150 may also be configured to engage with or couple to the annular cap 550. As shown in FIG. 14, the outer sleeve 150 may be clamped or crimped by flanges 155 onto the annular cap 550. In other embodiments, the outer sleeve 150 may be frictionally engaged with one or more of the annular cap 550, the lever assembly 130, or the inner sleeve 450.

Figure 15:
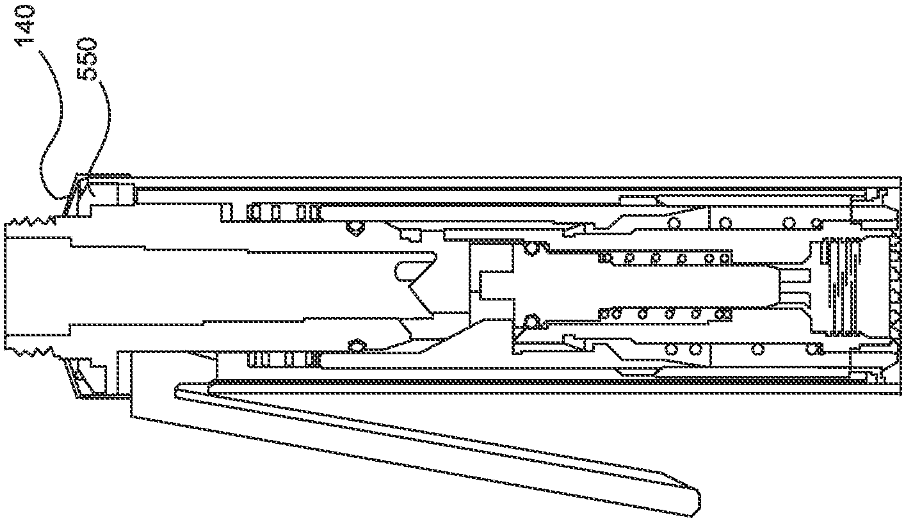
FIG. 15 is a cross section view of various components of the spray assembly of FIG. 1.

Now referring to FIG. 15 an annular cover 140 is shown positioned atop the annular cap 550. The annular cover 140 may be configured to engage with or couple to the annular cap 550. For example the annular cover 140 may be frictionally engaged with the annular cap 550.

Figure 16:
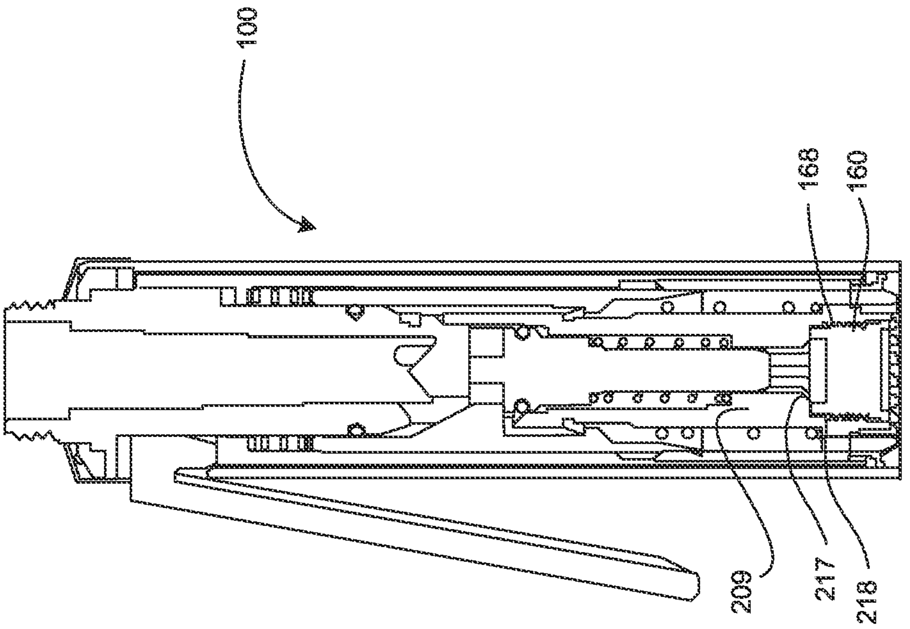
FIG. 16 is a cross section view of the spray assembly of FIG. 1.

Referring to FIG. 16, a spray head 160 is shown positioned in the outlet portion 217 of the first passage 210 of the first shaft 200. The spray head 160 is generally tubular in shape and includes a threaded portion 168 that is configured to selectively engage with the threaded portion 218 of the first shaft 200. The spray head 160 is configured as an aerator that receives a fluid from the outlet portion 217 and provides the fluid in an aerate spray pattern axially outward from the spray assembly 100.

Figure 17:
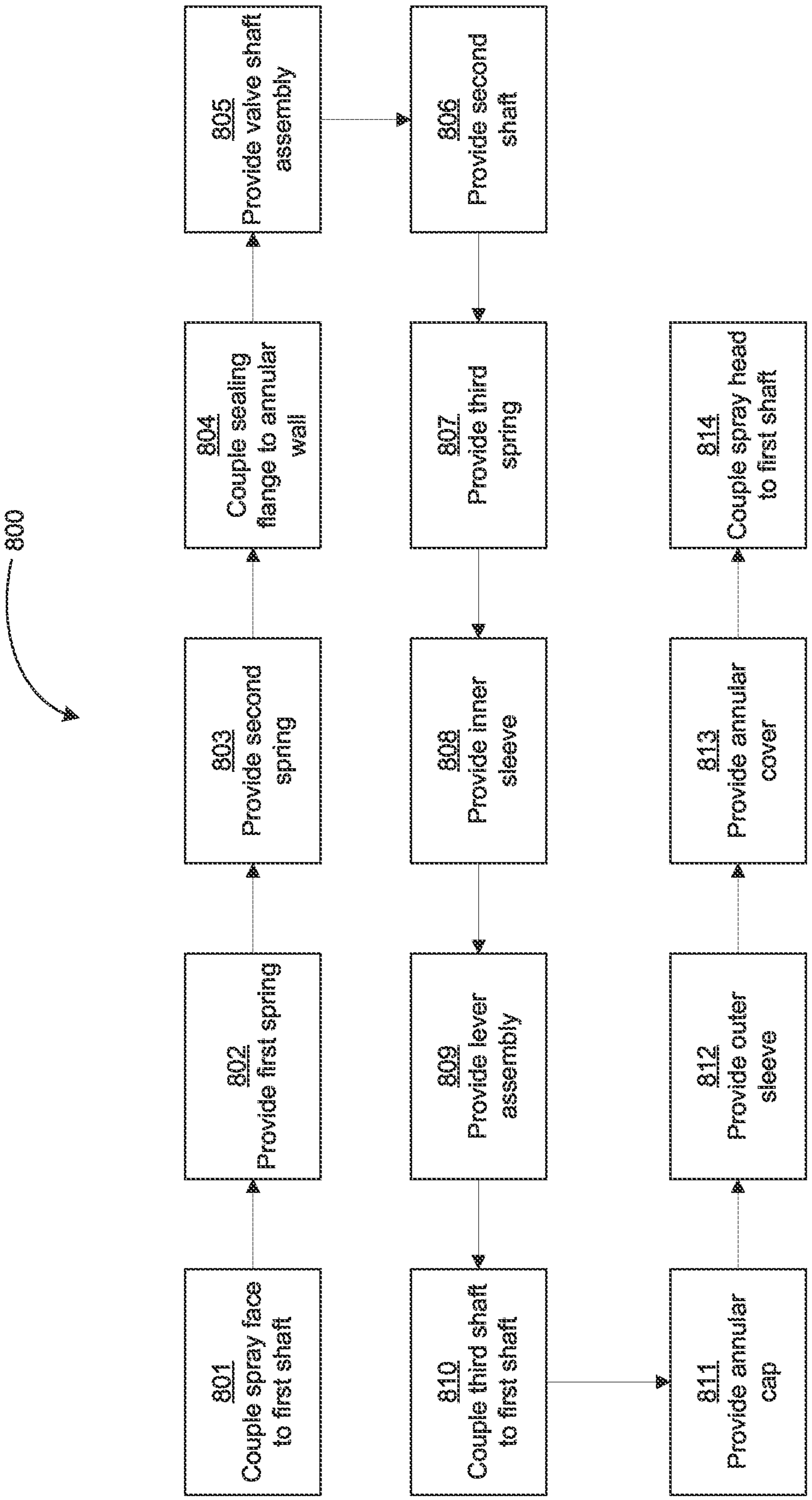
FIG. 17 is a flow chart of a method of assembling the spray assembly of FIG. 1.

Referring to FIG. 17, a flow chart 800 of a method of assembling the spray assembly 100 is shown, according to an exemplary embodiment.

At step 801, the spray face 190 is coupled to the first shaft 200. In some embodiments, the spray face 190 and the first shaft 200 are coupled together by an adhesive, epoxy, or other means. In other embodiments, the spray face 190 and the first shaft 200 are coupled together by a friction-fit interface (e.g., press-fit, snaps, etc.).

At step 802, the first spring 301 is provided in the first passage 210 of the first shaft 200. At step 803, the second spring 302 is provided in the second passage 220 of the first shaft 200.

At step 804, the sealing flange 321 is coupled to an outer portion of the annular wall 209 of the first shaft 200. In some embodiments, the sealing flange 321 may be coupled to the annular wall 209 by an adhesive, epoxy, or other chemical means. In other embodiments, the sealing flange 321 may be coupled to the annular wall 209 by a friction-fit method.

At step 805, the valve shaft 250 is coupled to the sealing ring 255 and is provided in the first passage 210 of the first shaft 200 above the first spring 301. In some embodiments, the sealing ring 255 may be coupled to the valve shaft 250 by an adhesive, epoxy, or other chemical means. In other embodiments, the sealing ring 255 may be coupled to the valve shaft 250 by a friction-fit method.

At step 806, the second shaft 400 is provided above the first shaft 200. The tapered sealing flange 430 is configured to form a fluid tight seal with the annular wall 209 of the first shaft 200. At step 807, the third spring 303 is provided above the second shaft 400. At step 808, the inner sleeve 450 is provided at least partially around the second shaft 400 and above the third spring 303. At step 809, the lever assembly 130 is provided above the inner sleeve 450.

At step 810, the third shaft 500 is provided at least partially within the central opening 135 of the lever assembly 130. The third shaft 500 is also coupled to the first shaft 200 by first shaft coupling portion 212 and the third shaft coupling portion 512.

At step 811, the annular cap 550 is provided at least partially around the third shaft 500. At step 812, the outer sleeve 150 is provided at least partially around the inner sleeve 450. The outer sleeve 150 is also at least partially coupled to the annular cap 550. In an exemplary embodiment, the outer sleeve 150 is coupled to the annular cap 550 by crimping flanges 155 onto or into the annular cap 550.

At step 813, the annular cover 140 is provided at least partially above the annular cap 550. The annular cover 140 may be coupled to the annular cap 550. In this arrangement, the annular cover 140 is coupled to the annular cap 550 by friction-fit assembly.

At step 814, the spray head 160 is coupled to the first shaft 200. The spray head 160 is coupled to the first shaft 200 by spray head threads 160 and first shaft threads 218.

Figure 18:
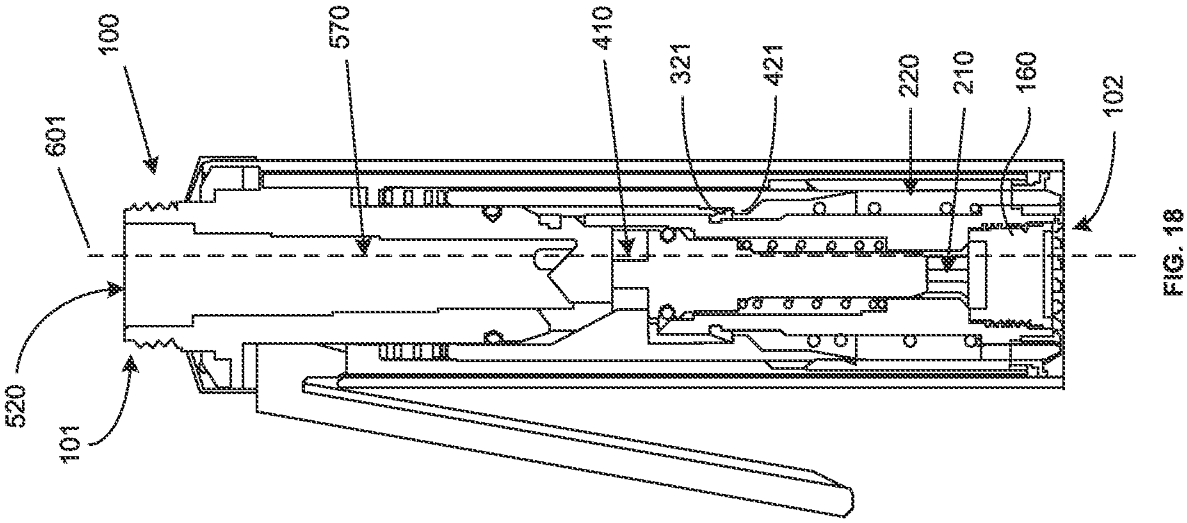
FIG. 18 is a cross section view of the spray assembly of FIG. 1, shown in a first position.

Now referring to FIG. 18, a cross section view of the spray assembly 100 in a first position of a plurality of positions is shown, according to an exemplary embodiment. In the first position, the spray assembly 100 is configured to receive a fluid (e.g., water) from a fluid source (e.g., a household water supply) at the spray assembly first end 101 and provide the fluid in an aerate spray pattern axially outward from the spray assembly second end 102. For example, the fluid may follow a flow path such as flow path 601 shown in FIG. 17. More specifically, the fluid may flow from the inlet portion 520, through the first passage 510 of the third shaft 500, through the first passage 410 of the second shaft 400, through the first passage 210 of the first shaft 200, through the spray head 160, and axially outward from the spray assembly 100.

In the first position, the lever 131 is in a normally open position (i.e., the lever 131 is not depressed). Also in the first position, the first spring 301, the second spring 302, and the third spring 303 are configured to be in a steady-state position. The sealing flange 421 is engaged with the sealing flange 321 such that the fluid does not flow to the second passage 220 of the first shaft 200.

Figure 19:
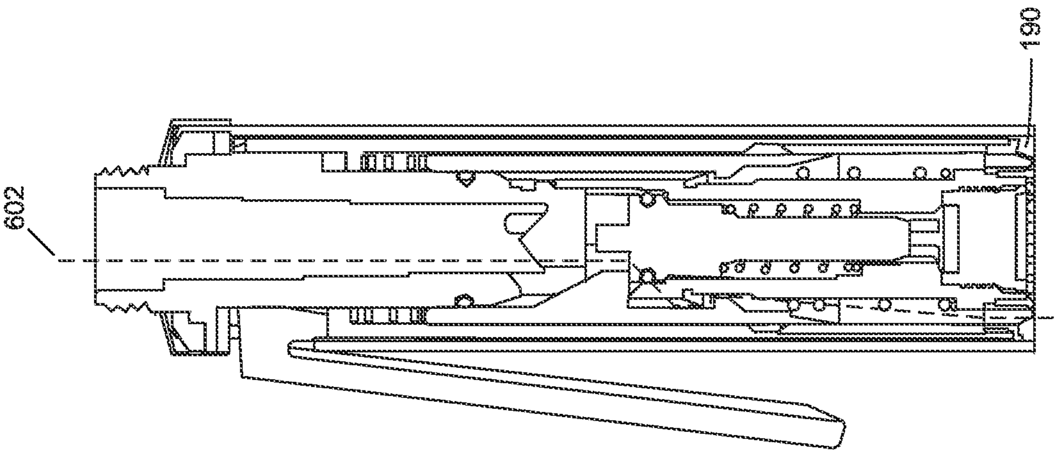
FIG. 19 is a cross section view of the spray assembly of FIG. 1, shown in a second position.

Referring to FIG. 19, a cross section view of the spray assembly 100 in a second position of the plurality of positions is shown, according to an exemplary embodiment. In the second position, the spray assembly 100 is configured to receive a fluid at the spray assembly first end 101 and provide the fluid at the spray assembly second end 102 in a sweep pattern. For example, the fluid may follow a flow path such as flow path 602 shown in FIG. 18. More specifically, the fluid may flow from the inlet portion 520, through the first passage 510 of the third shaft 500, through the first passage 410 of the second shaft 400, through the second passage 220 of the first shaft 200, through the spray face 190, and axially outward from the spray assembly 100.

In the second position, the lever 131 is in a partially closed/depressed position. According to an exemplary embodiment, as the lever 131 is actuated from the first position to the second position, the first spring 301 is configured to provide a first resistance to actuating the lever. Additionally, the second spring 302 may provide a second resistance to actuating the lever. In an exemplary embodiment, the first resistance may be less than the second resistance because the spring constant of the first spring 301 is less than the spring constant of the second spring 302. In an additional exemplary embodiment, the first resistance and the second resistance may be provided in series, concurrently, or partially concurrently. The resistances provided by the first spring 301 and the second spring 302 may be configured to provide tactile feedback to a user to indicate that the spray mode is changing. In the second position, the first spring 301 and the second spring 302 are configured to be at least partially compressed. The third spring 303 is configured to have a greater spring constant and therefore will not be compressed as much as the first spring 301 and the second spring 302. The sealing flange 421 is no longer engaged with the sealing flange 321 such that the fluid may flow to the second passage 220 of the first shaft 200.

Figure 20:
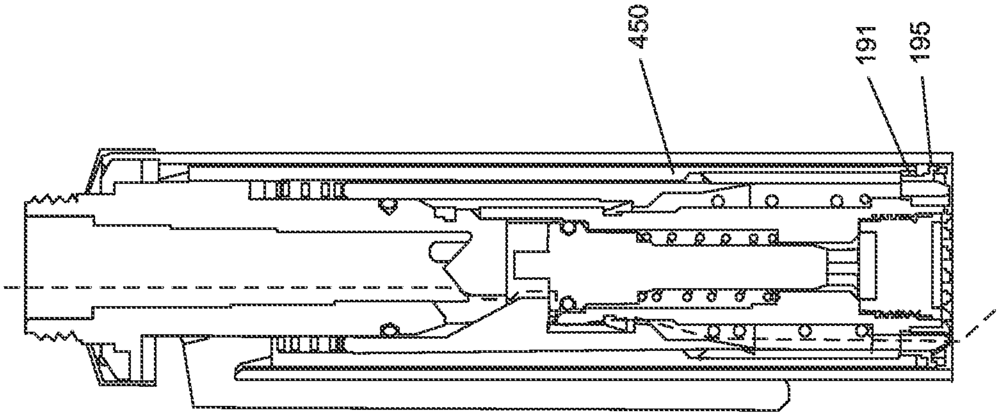
FIG. 20 is a cross section view of the spray assembly of FIG. 1, shown in a third position.

Referring to FIG. 20, a cross section view of the spray assembly 100 in a third position of a plurality of positions is shown, according to an exemplary embodiment. In the third position, the spray assembly 100 is configured to receive a fluid at the spray assembly first end 101 and provide the fluid at the spray assembly second end 102 in a concentrated stream pattern. For example, the fluid may follow a flow path such as flow path 602 shown in FIG. 18. More specifically, the fluid may flow from the inlet portion 520, through the first passage 510 of the third shaft 500, through the first passage 410 of the second shaft 400, through the second passage 220 of the first shaft 200, through the spray face 190, and outward from the spray assembly 100.

In the third position, the lever 131 is in a fully closed/depressed position. According to an exemplary embodiment, as the lever is actuated from the first position to the second position, the third spring 303 may provide a third resistance to actuating the lever 131. The third resistance may be provided concurrently or partially concurrently with the first resistance or the second resistance, or the third resistance may be provided serially after the first resistance and the second resistance. The resistances provided by the first spring 301, the second spring 302, and the third spring 303 may be configured to provide tactile feedback to a user to indicate that the spray mode is changing. In the third position, the first spring 301, the second spring 302, and the third spring 303 are each at least partially compressed. The sealing flange 421 is no longer engaged with the sealing flange 321 such that the fluid may flow to the second passage 220 of the first shaft 200. The outer sleeve 450 is configured to actuate the annular flange 195 of the spray face 190 such that one or more of the nozzles 191 are deflected inward towards a central axis of the spray assembly 100. When directed in this manner, the nozzles 191 are configured to provide a concentrated stream spray. When a user releases the lever 131, the nozzles 191 will bias or return back to their original position.

In an exemplary embodiment, the first spring 301, the second spring 302, and the third spring 303 may limit the movement of various internal components of the spray assembly 100. For example, the first spring 301 may be configured to limit the movement of the valve shaft 250, the second spring 302 may be configured to limit the movement of the second shaft 400, and the third spring 303 may be configured to limit the movement of the inner sleeve 450.

In other embodiments, each of the first spring 301, the second spring 302, and the third spring 303 may be configured to be actuated sequentially, concurrently, or partially concurrently in any order of combination as the lever 131 is actuated from the first position (e.g., the open position) to the third position (e.g., the closed position). In these arrangements, the spring constant of the first spring 301, the second spring 302, and the third spring 303 may be selected from a different set of values.

Figure 21:
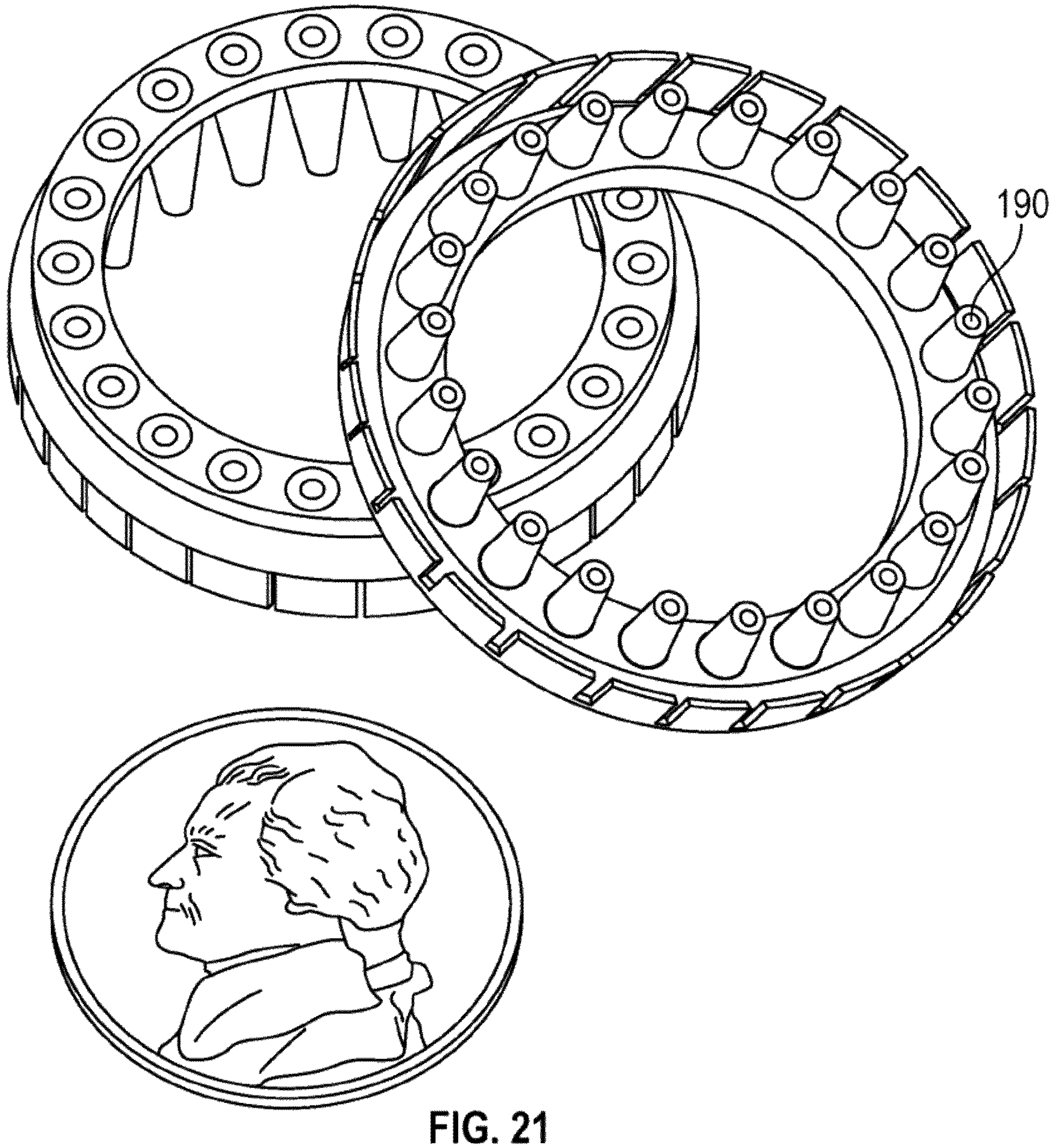
FIG. 21 is a side perspective view of a spray face of the spray assembly of FIG. 1.
Figure 22:
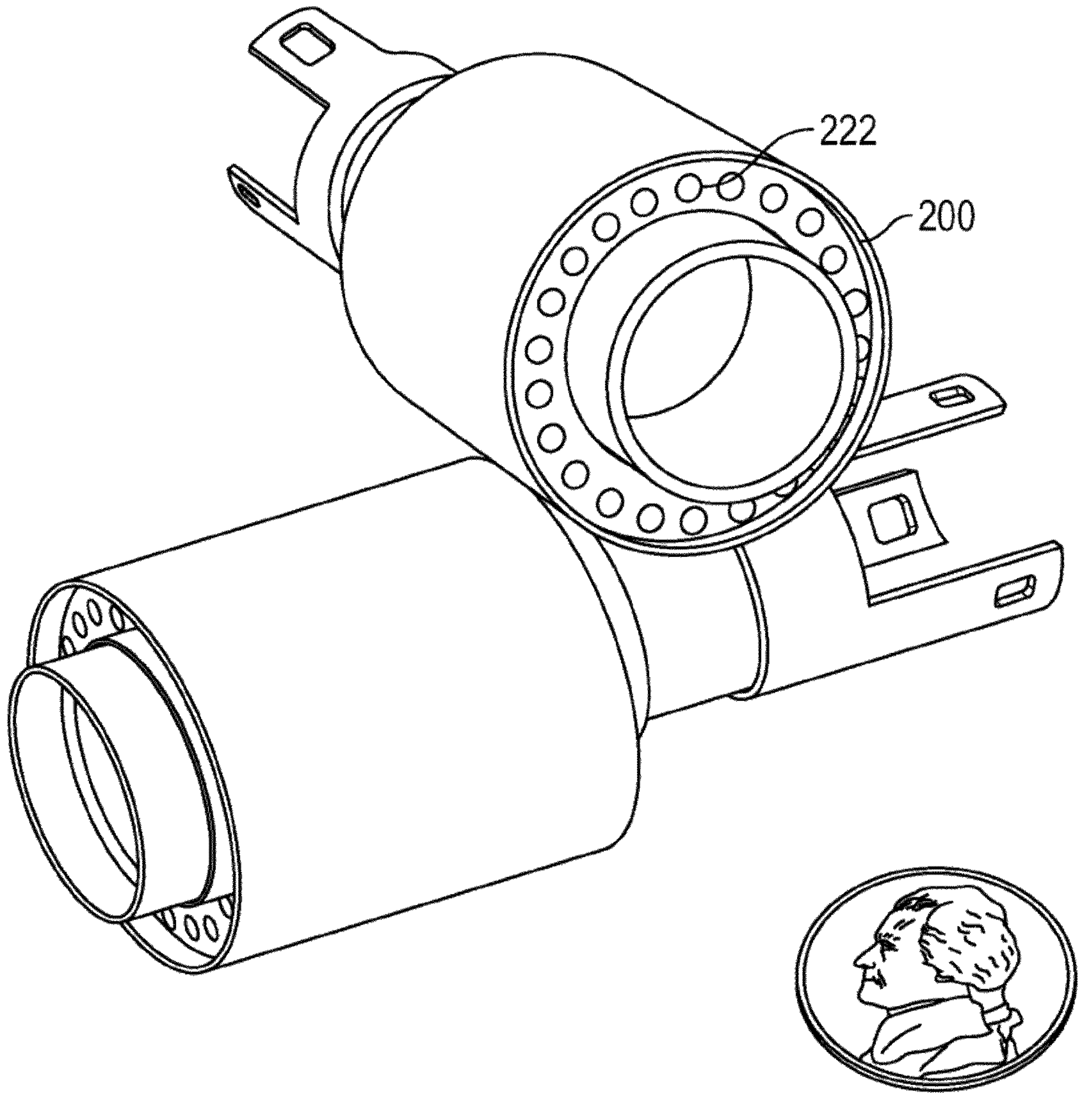
FIG. 22 is a side perspective view of a first shaft of the spray assembly of FIG. 1.
Figure 23:
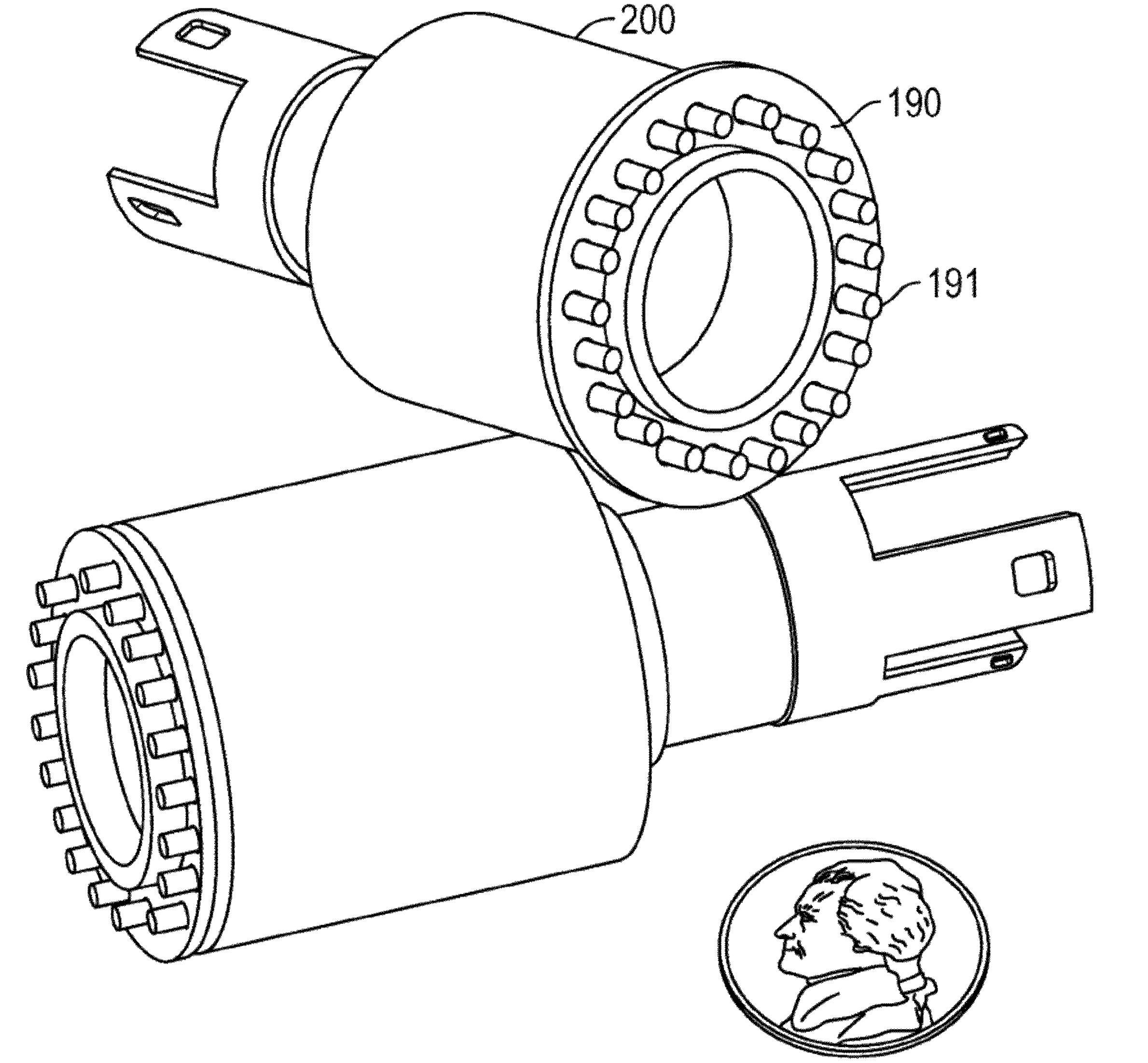
FIG. 23 is a perspective view of the spray face and the first shaft of the spray assembly of FIG. 1.

Referring to FIGS. 21-23, various views of the spray face 190 and connected components are shown, according to various exemplary embodiments. A side perspective view of a spray face of the spray assembly is shown in FIG. 21.

FIG. 22 is a side perspective view of a first shaft 200 of the spray assembly, according to an exemplary embodiment. The second passage 220 of the first shaft 200 includes a plurality of channels 222 that are each configured to interface with one of the nozzles 191 of the spray face 190.

FIG. 23 is a perspective view of the spray face 190 coupled to the first shaft 200 of the spray assembly 100, according to an exemplary embodiment. Each of the nozzles 191 of the spray face 190 are configured to couple to the one of the plurality of channels 222 such that each of the nozzles 191 are in fluid communication with one of the plurality of channels 222.

Figure 24:
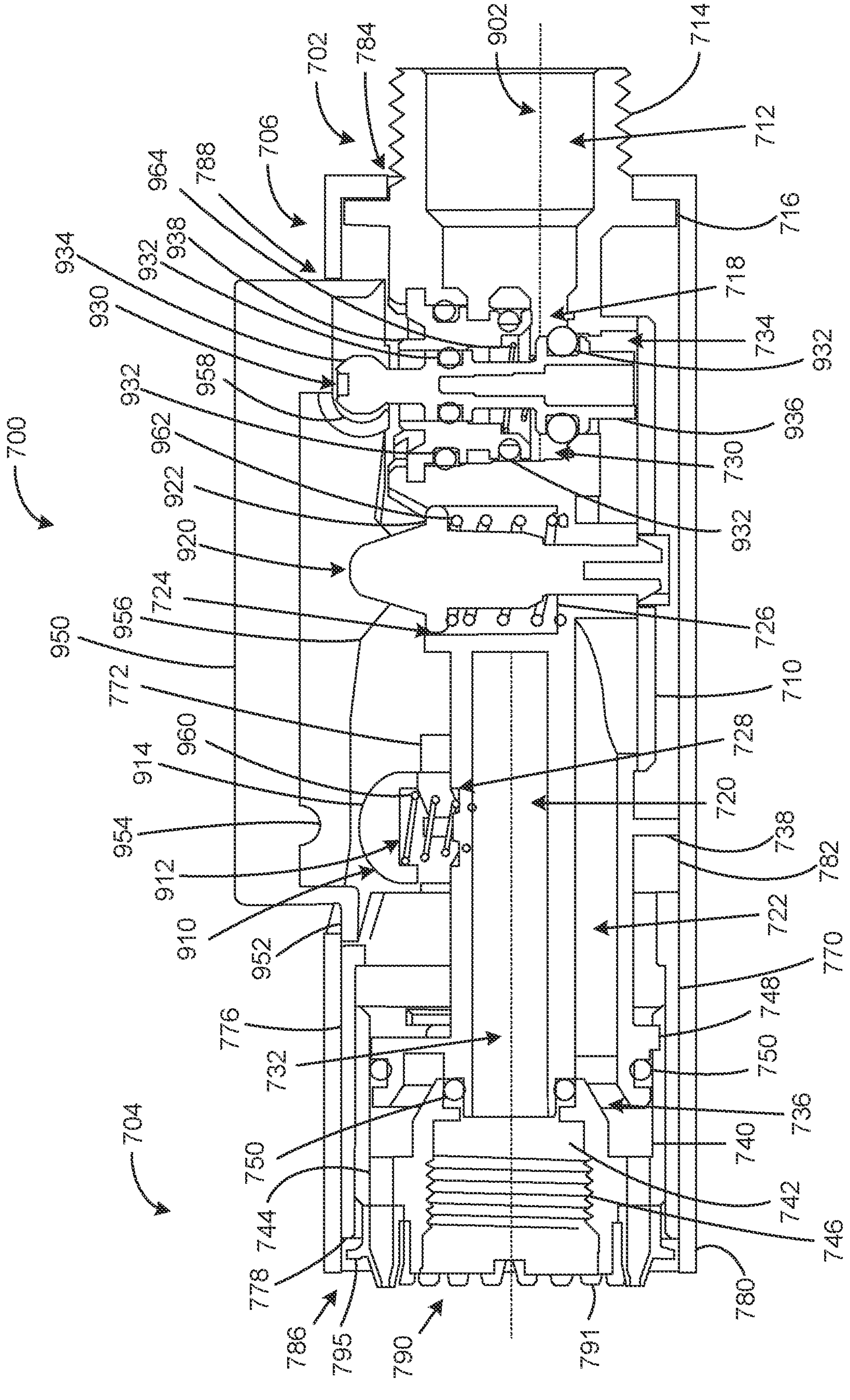
FIG. 24 is a cross section view of a spray assembly, according to another exemplary embodiment, shown in a first position.

FIG. 24 is a cross section view of a spray assembly 700, according to an exemplary embodiment, shown in a first position. The spray assembly 700 is structured to be coupled to a fluid supply and provide a fluid output. Accordingly, in some embodiments, the spray assembly 700 may include components that are similar to the components of the spray assembly 100. For example, the spray assembly 700 includes a lever 950 to rely on mechanical advantage to actuate a plurality of spray modes (e.g., three or more, etc.). The spray modes may include an aerate spray, a sweep spray, and a concentrated/stream spray. The internal structure of the spray assembly 700 includes various shafts/sleeves within a spray body 706 of the spray assembly 100 to direct the flow through different fluid passages.

According to an example embodiment, the spray assembly has a first end 702 (e.g., a proximal end, an inlet end, etc.) and a second end 704 (e.g., a distal end, an outlet end, etc.) opposite the first end 702. The first end 702 may be structured to fluidly couple to a fluid source and the second end 704 may be structured to provide the fluid output. The spray assembly 700 includes a lever 950 structured to actuate various valves, shafts, and/or sleeves within the spray assembly 700 to change a fluid flow path. As shown, the spray assembly 700 includes a central body 710, an outlet body 740, an inner sleeve 770, an outer sleeve 780 and a spray face 790. The spray assembly also includes a first shaft 910, a second shaft 920, and a third shaft 930. The spray assembly 700 also includes one or more elastic members shown as springs 960, 962, and 964.

The inner body 710 includes an inlet portion 712 disposed at the first end 702 of the spray assembly 700. The inlet portion 712 include defines at least one thread 714 for coupling the spray assembly to a fluid source. The inner body 710 also defines a third pocket 718 structured to receive the third shaft 930. The third pocket 718 also defines an inlet of a first channel 720 and a second channel 722.

In some embodiments, an annular wall 716 extends radially outwards from the inner body 710 at the inlet portion 712. The annular wall 716 is configured to contact and/or couple to the outer sleeve 780.

The first channel 720 and the second channel 722 are each in fluid communication with the inlet portion 712. In some embodiments, the first channel 720 and the second channel 722 are substantially parallel. The first channel 720 has a first channel inlet 730 disposed at the first end 702 of the spray assembly 700 and a first channel outlet 732 disposed at the second end 704 of the spray assembly 700. In some embodiments, the first channel inlet 730 is in fluid communication with the inlet portion 712 via the third pocket 718. The second channel 722 has a second channel inlet 734 disposed at the first end 702 of the spray assembly 700 and a second channel outlet 736 disposed at the second end 704 of the spray assembly 700. In some embodiments, and as shown in FIG. 24, the second channel 722 is disposed radially outward of the first channel 720. In some embodiments, at least a portion of the second channel 722 extends circumferentially around the first channel 720. For example, the second channel outlet 736 may extend circumferentially around the first channel outlet 732.

The inner body 710 also defines a second pocket 724 (e.g., a central pocket) that is structured to receive the second shaft 920. As shown, the second pocket 724 may extend at least partially through the first channel 720 and the second channel 722 such that a first flow path 902 defined by the first channel 720 and a second flow path 904 defined by the second channel 722 are defined around the second pocket 724. The second pocket 724 may include an upper portion and a lower portion. The upper portion of the second pocket 724 may have a larger diameter than the lower portion such that a shoulder 726 is defined between the upper portion and the lower portion of the second pocket 724. The spring 962 may contact and/or be biased against the shoulder 726.

The inner body 710 may also include a first pocket 728 defined on an outer surface of the inner body 710. The first pocket 728 may be an annular recess that is structured to receive at least a portion of the spring 960. In some embodiments, the first pocket 728 also receives at least a portion of the first shaft 910.

In some embodiments, the inner body 710 also includes a radial flange 738 that extends radially outward from the inner body 710. The radial flange 738 is positioned opposite the first pocket 728. In some embodiments, the radial flange 738 is structured to contact and/or couple to the outer sleeve 780. In some embodiments, the radial flange 738 is structured to provide rigidity to the inner body 710 such that when the first shaft 910 is depressed by the lever 950, the inner body 710 is substantially prevented from moving or deflecting.

In some embodiments, the inner body 710 is coupled to an outlet body 740. In some embodiments, the outlet body 740 is coupled to the inner body 710 in a snap fit arrangement. For example, the outlet body 740 may include an annular notch 748 structured to receive at least a portion of the inner body 710. In some embodiments, the annular notch 748 extends around the circumference of the inner body 710 (e.g., at the second channel outlet 736). In some embodiments, the annular notch 748 only extends partially around the circumference of the inner body. In some embodiments, the inner body 710 is coupled to the outlet body 740 such that a fluid tight seal is formed therebetween. In some embodiments, the spray assembly 700 includes one or more sealing members (e.g., O-rings, gaskets, etc.) shown as sealing members 750. The outlet body 740 includes an inner chamber 742 and an outer chamber 744.

The inner chamber 742 is fluidly coupled to the first channel 720 at the first channel outlet 732. In some embodiments, one of the sealing members 750 is positioned at or near the connection between the first channel 720 and the inner chamber 742 such that a fluid tight seal is formed between a surface of the inner body 710 and a surface the outlet body 740 and fluid can flow from the inner body 710 to the outlet body 740 along a first flow path (e.g., first flow path 902). In some embodiments, fluid flows along the first flow path 902 such that the inner chamber 742 receives fluid from first channel 720 and provides a first spray mode (e.g., an aerate spray) as the fluid flows out of the inner chamber 742. Accordingly, the first follow path 902 flows through at least the inner body 710 and the outlet body 740. The inner chamber 742 may also include at least one thread 746. The at least one thread 746 may be structured to receive at least one thread of a faucet attachment, for example a filter, an extension, and the like.

The outer chamber 744 is fluidly coupled to the second channel 722 at the second channel outlet 736. In some embodiments, the outer chamber 744 is also fluidly coupled to the spray face 790. In some embodiments, one of the sealing members 750 is positioned at or near the connection between the second channel 722 and the outer chamber 744 such that a fluid tight seal is formed between a surface of the inner body 710 and a surface of the outlet body 740 and fluid can flow from the inner body 710 to the outlet body 740 along a second (e.g., second flow path 904, see FIG. 25). Accordingly, the second follow path 904 flows through at least the inner body 710 and the outlet body 740.

The inner sleeve 770 includes a proximal portion 772 and a distal portion 776. The proximal portion 772 is positioned near the first pocket 728 and extends at least partially circumferentially around the inner body 710. In some embodiments, and as described herein below, the proximal portion 772 may be operably coupled to the first shaft 910 and/or a portion of the inner body 710.

Figure 27:
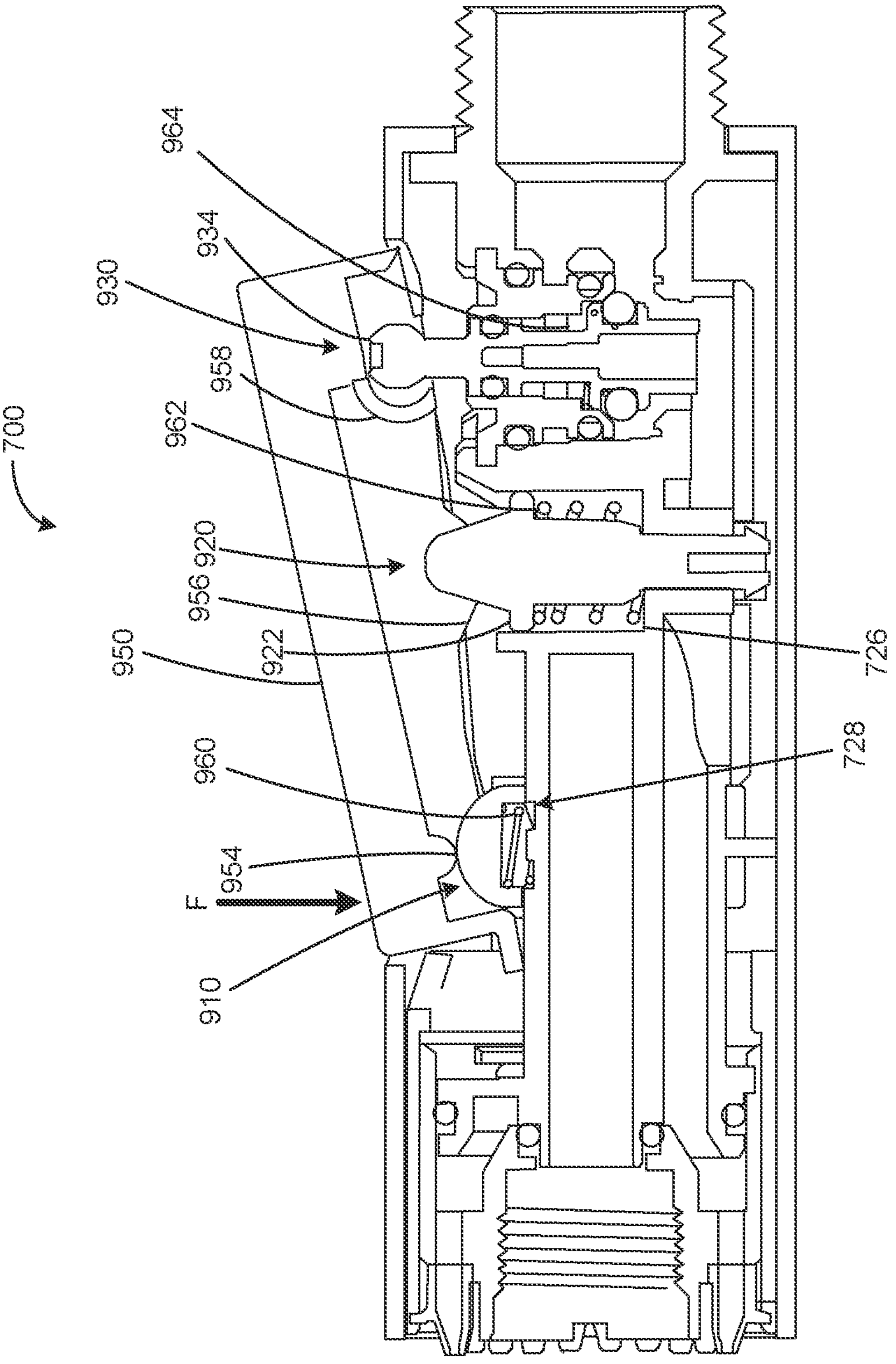
FIG. 27 is a cross section view of the spray assembly of FIG. 24, shown in a third position.

The distal portion 776 is positioned near the outlet body 740 and extends at least partially circumferentially around the outlet body 740. The distal portion 776 may include an extended portion 778 that selectively contacts an annular flange 795 of the spray face 790. In some embodiments, the inner sleeve 770 is structured to be operable between a first position (as shown in FIG. 24) and a second position (as shown in FIG. 27). When the inner sleeve 770 is in the first position, the extended portion 778 does not contact the annular flange 795. When the inner sleeve 770 is in the second position, the extended portion 778 contacts the annular flange 795.

The outer sleeve 780 extends at least partially between the first end 702 and the second end 704. The outer sleeve 780 at least partially contains the various components of the spray assembly 700. In some embodiments, the outer sleeve 780 may be configured to have an ornamental exterior (e.g., brass, stainless steel, etc.). In additional embodiments, the ornamental exterior may be configured to match nearby fixtures in, for example, a kitchen environment.

The outer sleeve 780 is configured to at least partially surround the central body 710, the outlet body 740, the inner sleeve 770, the spray face 790, the first shaft 910, the second shaft 920, the third shaft 930, and/or the springs 960, 962, and 964. The outer sleeve 780 may also include an inner annular wall 782 that is configured to engage with or couple to the radial flange 738 of the inner body 710, as described above. In some embodiments, the outer sleeve 780 may be coupled to the inner body 710 by a fastener (e.g., a screw, a bolt, etc.), by an adhesive, (e.g., glue, epoxy, etc.), by a snap fit arrangement, and/or by a molding process (e.g., over molding, etc.). In some embodiments, the outer sleeve 780 may be frictionally engaged with the inner body 710 and/or the inner sleeve 770.

In some embodiments, the outer sleeve 780 has one or more openings shown as a proximal opening 784, a distal opening 786, and a lever opening 788. The proximal opening 784 is structured to receive at least a portion of the inner body 710. For example, the inlet portion 712 may at least partially extend through the proximal opening 784 such that the at least one thread 714 extends axially away from the proximal opening 784 of the outer sleeve 780. The distal opening 786 is structured to allow fluid to flow out of the spray assembly 700. For example, the distal opening 786 may allow fluid following the first flow path 902 and/or the second flow path 904 to flow out of the spray assembly 700. The lever opening 788 is structured to receive the lever 950 such that the lever is operable to move between a plurality of positions (e.g., a first position, a second position, and a third position).

The spray face 790 is shown coupled to outlet body 740 at the outer chamber 744. In some embodiments, the spray face 790 may be coupled to the outlet body 740 by a friction-fit coupling (e.g., press-fit/snap-fit). In other embodiments, the spray face 790 may be coupled to the outlet body 740 by an adhesive (e.g., glue, epoxy, etc.) or a fastener (e.g., bolt, pin, etc.) or over molded onto the outlet body 740.

Figure 25:
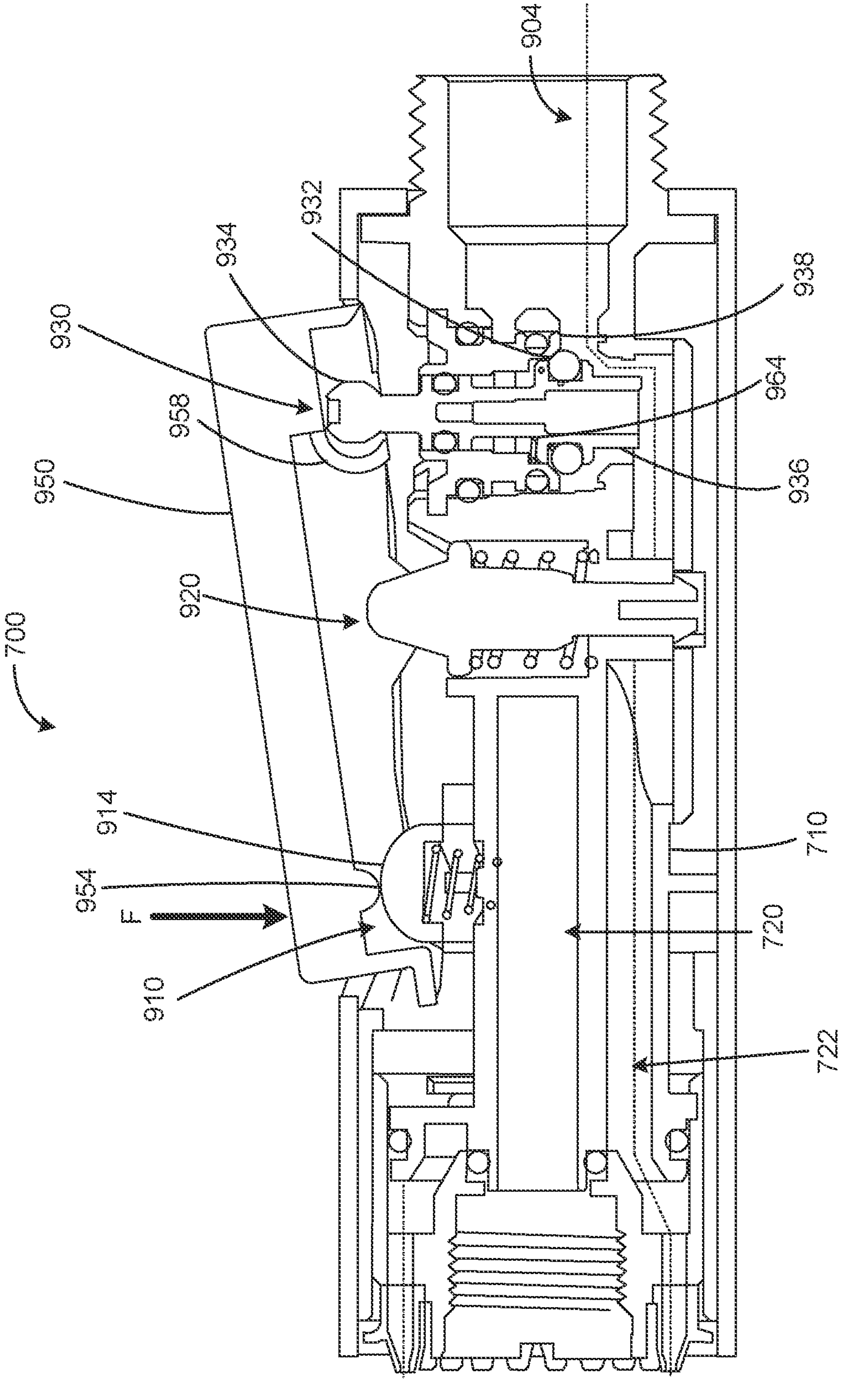
FIG. 25 is a cross section view of the spray assembly of FIG. 24, shown in a second position.
Figure 26:
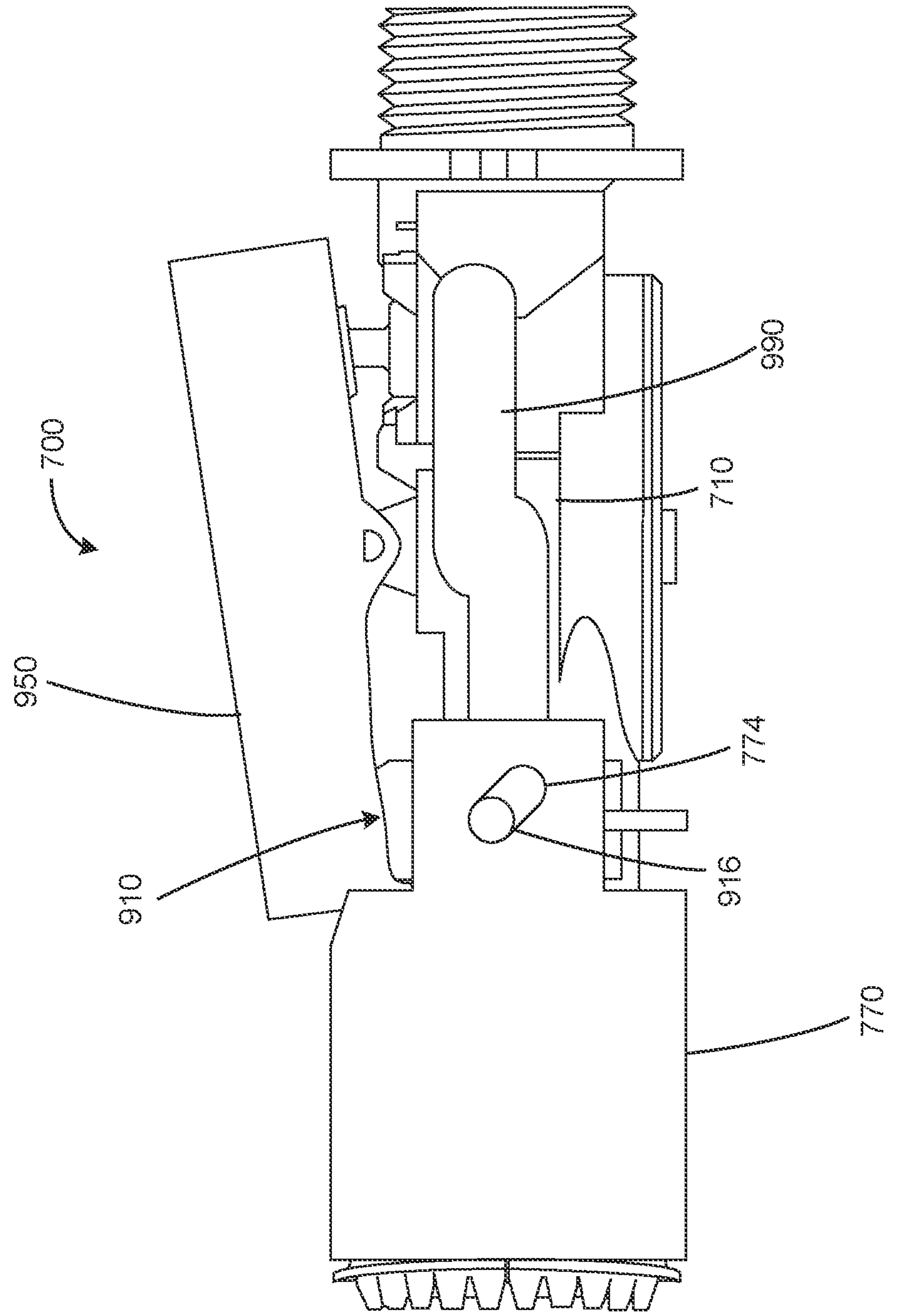
FIG. 26 is a side perspective view of the spray assembly of FIG. 24, shown in the second position.
Figure 28:
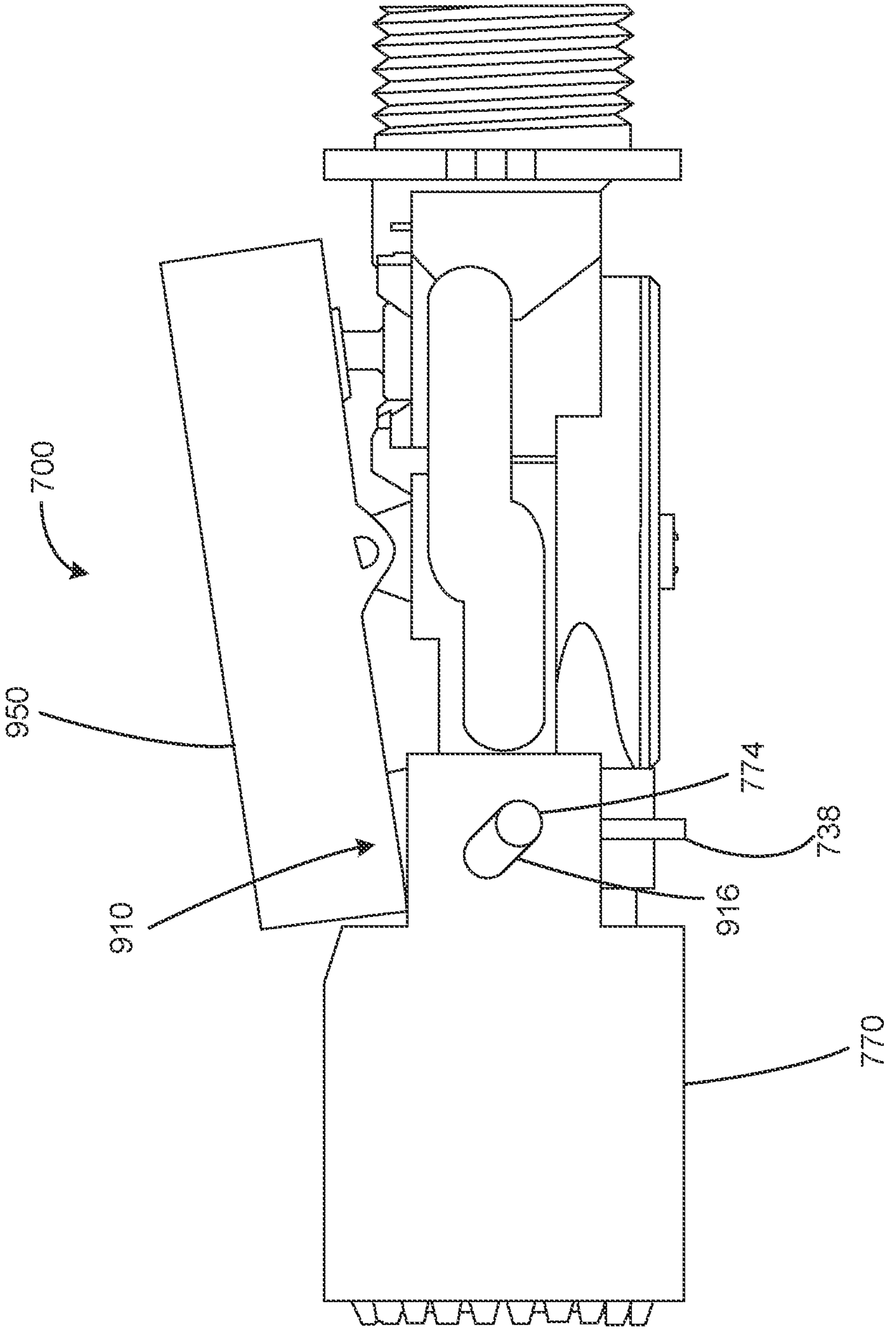
FIG. 28 is a side perspective view of the spray assembly of FIG. 24, shown in the third position.
Figure 29:
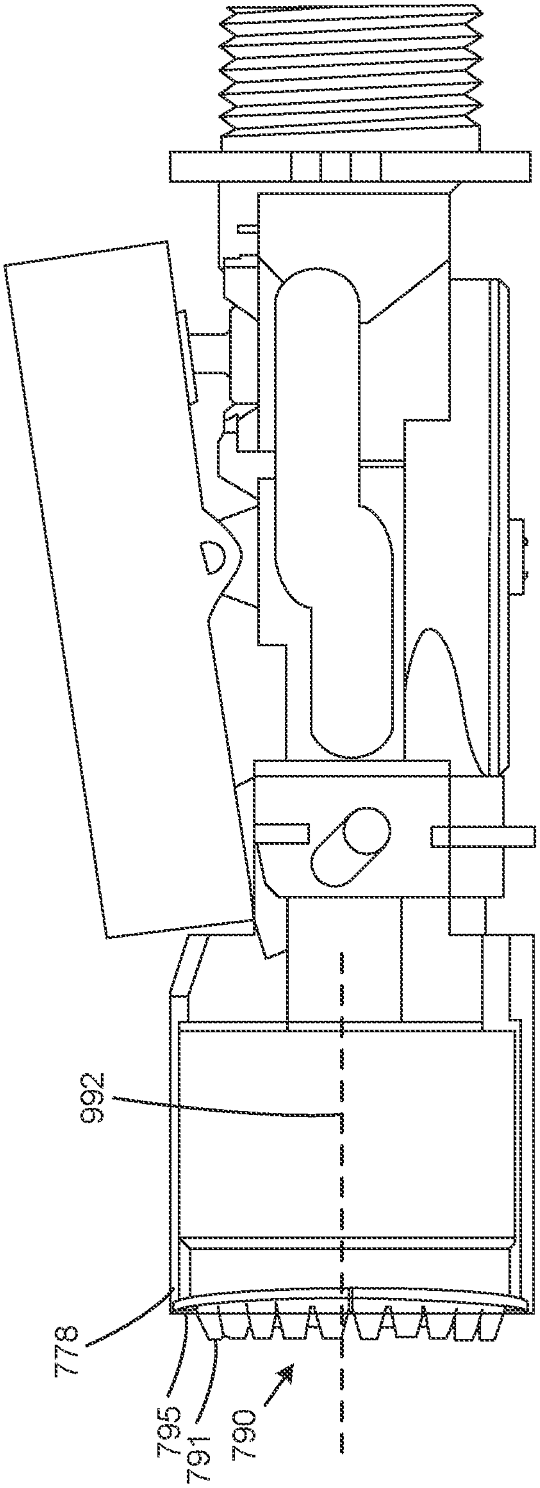
FIG. 29 is a detailed section view of the spray assembly of FIG. 24, shown in the third position.

The spray face 790 may be substantially similar to or the same as the spray face 190. For example the spray face 790 may be made of a polymer or elastic material or include portions that are made from an elastic material, such that at least a portion of the spray face 790 is selectively deformable. The spray face 790 is generally annular in shape and includes a plurality of nozzles 791 disposed about a perimeter of the spray face 790. Each of the nozzles 791 is configured to receive a fluid through an inlet and provide the fluid via an outlet. The spray face 790 also includes an annular flange 795. The annular flange 795 is configured to operate the nozzles 791 in a plurality of positions. As shown in FIGS. 24-26, the nozzles 791 and the annular flange 795 are in a first position of a plurality of positions. In the first position, the nozzles 791 are configured to provide fluid in a first pattern (e.g., a sweep pattern). In a second position as shown in FIGS. 27-29, the nozzles 791 are configured to provide fluid in a second pattern (e.g., a stream pattern). In some embodiments, when the nozzles are in positions between the first position and the second position, the nozzles 791 are configured to provide fluid in a pattern that is between the first pattern and the second pattern (e.g., a part-stream-part-sweep pattern).

The first shaft 910 is disposed at the first pocket 728. In some embodiments, the first shaft 910 defines a first shaft inner volume 912 that is substantially hollow and structured to receive a first spring 960. The first shaft 910 includes a domed portion 914 disposed at the lever 950. The first shaft 910 is operable between a first position (as shown in FIG. 24) and a second position (as shown in FIG. 27). The first spring 960 is structured to bias the first shaft 910 to the first position. The first shaft 910 may be actuated (e.g., by the lever 950) from the first position to the second position. For example, at least a portion of the lever 950 may contact the first shaft 910 at the domed portion 914 and depress the first shaft 910 by overcoming the biasing force of the first spring 960.

In some embodiments, at least a portion of the first shaft 910 is operably coupled to the inner sleeve 770 such that, when the first shaft 910 is actuated from a first shaft first position to a first shaft second position, the first shaft 910 actuates the inner sleeve 770 from an inner sleeve first position to an inner sleeve second position.

The second shaft 920 is disposed at the second pocket 724. In some embodiments, the second shaft 920 extends at least partially through the inner body 710 within the second pocket 724. The second shaft 920 is pivotably coupled to the lever 950. In some embodiments, the second shaft 920 includes an annular flange 922 that extends at least partially circumferentially around the second shaft 920. The annular flange 922 is structured to contact the second spring 962 such that the second spring 962 is retained between the annular flange 922 and the shoulder 726 of the second pocket 724. The second shaft 920 is operable between a first position (as shown in FIG. 24) and a second position (as shown in FIG. 27). The second spring 962 is structured to bias the second shaft 920 to the first position. The second shaft 920 may be actuated (e.g., by the lever 950) from the first position to the second position. For example, the lever 950 may depress the second shaft 920 by overcoming the biasing force of the first spring 962.

The third shaft 930 is disposed at the third pocket 718. In some embodiments, the third shaft 930 extends at least partially through the inner body 710 within the third pocket 718. In some embodiments, the third shaft 930 is a valve shaft structured to direct the fluid flow within the inner body 710. For example, the third shaft 930 may be structured to selectively direct a fluid that enters the inner body 710 at the inlet portion 712 to at least one of the first channel 720 and the second channel 722.

As shown in FIG. 24, the third shaft 930 includes one or more sealing members (e.g., O-ring, gasket, etc.) shown as sealing members 932. One or more of the sealing members 932 may be structured to form a fluid-tight seal between the third shaft 930 and the inner body 710. In some embodiments, the third shaft includes a valve pin 934 disposed at the lever 950. The valve pin 934 is structured to be actuated by a track portion 958 of the lever 950. In some embodiments, the third shaft also includes a valve shaft 936 and a valve body 938. In some embodiments, one or more of the sealing members 932 may form a seal between the valve body 838 and the valve shaft 836. In some embodiments, the valve shaft 936 is operable between a first valve position (shown in FIG. 24) and a second valve position (shown in FIG. 25). That is, the valve shaft 936 is movable relative to the valve body 938. In some embodiments, the third spring 964 is positioned between the valve shaft 936 and the valve body 938. The third spring 964 is structured to bias the valve shaft 936 in the first valve position. In some embodiments, the lever may actuate the valve shaft 936 when the lever 950 is depressed. In some embodiments, the valve pin 934 follows the track portion 958 as the lever 950 is depressed thereby moving the valve shaft 936 from the first valve position to the second valve position. In the first valve position, the valve shaft 936 is structured to direct a fluid from the inlet portion 712 to the first channel 720. For example, at least one of the sealing members 932 may form a seal between the valve shaft 936 and the inner body 710 such that a fluid is substantially prevented from flowing from the inlet portion 712 to the second channel 722.

The lever 950 is disposed at the lever opening 788. The lever 950 at least partially extends radially away from the outer sleeve 780. The lever 950 is an elongated member that is configured to be operable in a plurality of positions. As shown in FIG. 24, the lever 950 is normally in a first position of the plurality of positions. The lever 950 is structured to actuate the first shaft 910, the second shaft 920, and the third shaft 930 as the lever is operated through the plurality of positions. The plurality of positions may include a first position (shown in FIG. 24), a second position (shown in FIG. 25), and a third position (shown in FIG. 27). The lever includes a distal flange 952 that extends axially towards the spray assembly second end 704. The distal flange 952 is structured to contact the outer sleeve 780 such that the lever 950 is substantially retained at least partially within the outer sleeve 780. In some embodiments, the lever 950 also includes a first flange 954, a second flange 956, and a track portion 958. The first flange 954 is structured to contact the domed portion 914 of the first shaft 910 when the lever is operated from the second position to the third position. As the lever is operated from the second position to the third position, the first flange 954 may follow the curvature of the domed portion 914 such that the lever continuously contacts the first shaft 910. The second flange 956 is structured to pivotably couple to the second shaft 920 such that the lever may selectively pivot about the second shaft 920. The track portion 958 is structured to at least partially retain the valve pin 934 such that the track portion 958 actuates the valve pin 934 and the valve shaft 936 as the lever 950 is operated from the first position to the second position.

In the first position, the lever 950 is in a normally open position (i.e., the lever 950 is not depressed). Also in the first position, the first spring 960, the second spring 962, and the third spring 964 are configured to be in a steady-state position. The first shaft 910, the second shaft, 920, and the third shaft 930 are each in a respective first position such that a fluid may flow along the first fluid path 902 (shown by a dotted line) from the inlet portion 712 to the first channel 720 and out of the spray assembly 700 via the outlet body 740.

FIG. 25 is a cross section view of the spray assembly 700 of FIG. 24, shown in a second position. In an exemplary embodiment, a user may actuate the lever 950 by applying a force (shown as force F) to at least a portion of the lever 950. As the lever 950 is actuated from the first position to the second position, the lever pivots about the second shaft 920 and actuates the third shaft 930 (e.g., the valve shaft 936). For example, as the lever 950 is pivoted about the second shaft 920, a distal portion of the lever 950 is actuated radially inward, towards the inner body 710 (e.g., downward) and a proximal portion of the lever 950 is actuated radially away from the inner body 710 (e.g., upward). As the proximal portion of the lever 950 is actuated away from the inner body 710, the valve pin 934 is retained within the track portion 958 such that the valve shaft 936 is actuated in the same direction (e.g., radially towards the lever 950). In some embodiments, the third spring 964 may be compressed between the valve shaft 936 and the valve body 938 as the valve shaft 936 is actuated. Accordingly, as the lever 950 is operated the third spring 964 may provide a third resistance to actuating the lever. As the lever 950 is operated, the second spring 962 biases the second shaft 920 towards the lever 950. Accordingly, as the lever 950 is operated the second spring 962 may provide a second resistance to actuating the lever. The second resistance may be substantially greater than the third resistance such that the second shaft 920 is substantially biased in a second shaft first position while the lever 950 is operated from the first lever position to the second lever position.

In an exemplary embodiment, the third resistance may be less than the second resistance. For example, the second spring 962 may have a higher spring constant (i.e., stiffness) than the third spring 964. In some embodiments, the second resistance and the third resistance may be provided in series, concurrently, or partially concurrently. The resistances provided by the first spring 960, the second spring 962, and the third spring 964 may be configured to provide tactile feedback to a user to indicate that the spray mode is changing. As the lever 950 is operated from the first position to the second position, the second spring 962 is not substantially deflected such that the second shaft 920 is stationary and the lever pivots about the second flange 956 at the second shaft 920. In some embodiments, the third spring 964 is full compressed by the lever 950 when the lever 950 is in the second position. In some embodiments, the first spring 960 is not compressed by the lever 950 because the first flange 954 does not contact the first shaft 910 until the lever 950 is in the second position. For example, the load of the lever 950 is the third shaft 930 and the stiffness of the third spring, the fulcrum is at the second shaft 920, and a force F is applied to the lever (e.g., by a user) as shown in FIG. 25.

In the lever second position, the lever 950 is in a partially closed/depressed position. In some embodiments, while the lever 950 is in the second position, the third spring 964 is fully compressed such that the valve shaft 936 is substantially prevented from being further actuated towards the lever 950. The second spring 962 is substantially uncompressed and/or may be partially compressed such that the second shaft 920 remains in a second shaft first position. The first flange 954 may not yet contact or just contact the domed portion 914 of the first shaft 910 such that the first shaft 910 remains in a first shaft first position.

When the lever 950 is in the second lever position, the valve shaft 934 is in the second valve position. In the second valve position, the valve shaft 934 is structured to direct a fluid from the inlet portion 712 to the second channel 722 along a second flow path 904. For example, At least one of the sealing members 932 of the valve shaft 936, when the valve shaft 936 is in the second (e.g., open) valve position is structured to form a fluid tight seal with the valve body 938 such that the fluid may flow to the second channel 722 and is substantially prevented from flowing to the first channel 710. In some embodiments, the fluid flows along the second flow path 904 such that the outer chamber 744 receives fluid from second channel 722 and through the spray face 790 as the fluid flows out of the outer chamber 744.

FIG. 26 is a side perspective view of the spray assembly of FIG. 24, shown in the second position. As shown, a plate 990 may be disposed on an outer surface of the inner body 710 to form a fluid tight seal thereon. The plate 990 may be positioned to enclose the first channel 720 such that fluid flowing along the first flow path 910 is substantially prevented from leaking out the side of the inner body 710.

In some embodiments, and as shown in FIG. 26, the first shaft 910 is operably coupled to the inner sleeve by a pin-track arrangement. For example, the first shaft 910 may include a pin 916. The pin 916 may be structured to at least partially extend through a portion of the inner sleeve 770. For example, the pin 916 may at least partially extend through a track portion 774 of the inner sleeve 770. In some embodiments, the first shaft 910 is structured to operate the inner sleeve 770 from a first sleeve position to a second sleeve position when the first shaft is operated from a first shaft first position (shown in FIG. 26) to a first shaft second position (shown in FIG. 27).

FIG. 27 is a cross section view of the spray assembly 700 of FIG. 24, shown in a third position. In an exemplary embodiment, a user may actuate the lever 950 from the second position to the third position by applying a force (shown as force F) to at least a portion of the lever 950. As the lever 950 is operated from the second position to the third position (e.g., a fully closed/depressed position) the lever 950 pivots about the stationary valve pin 934 of the third shaft 930. The lever 950 actuates the first shaft 910 and the second shaft 920 as the lever 950 is actuated from the second position to the third position. For example, as the lever 950 is pivoted about the valve pin 934, the distal portion of the lever 950 is actuated radially inward, towards the inner body 710 (e.g., downward). As the distal portion of the lever 950 is actuated towards the inner body 710, the first shaft 910 and the second shaft 920 are actuated radially away from the lever 950. In some embodiments, the first spring 964 may be compressed between an inner surface of the first shaft 910 and the first pocket 728 as the first shaft 910 is actuated. In some embodiments, the second spring 962 is compressed between the annular flange 922 and the shoulder 726 as the second shaft 920 is actuated. Accordingly, as the lever 950 is actuated form the second position to the third position, the first spring 960 and the second spring 964 may provide a first resistance and a second resistance, respectively, to actuating the lever 950. The first resistance may be provided concurrently or partially concurrently with the second resistance, or the second resistance may be provided serially after the first resistance. The resistances provided by the springs 960, 962, 964 may be configured to provide tactile feedback to a user to indicate that the spray mode is changing.

As the lever 950 is actuated from the second position to the third position, the fulcrum of the lever changes from the first flange 956 rotating around the second shaft 920 to the track portion 958 rotating around the valve pin 934. The "load" of the lever 950 changes from the valve shaft 934 to the second shaft 920 and/or the first shaft 910. The force applied by the user remains at the distal end of the lever 950. Accordingly, the spray assembly 700 includes a moving fulcrum feature (e.g. changing from a location on the lever 950 corresponding to the second shaft 920 to the third shaft 934) that is structured to assist in changing spray modes within the spray assembly 700.

When the lever 950 is in the third lever position, the first shaft 910, the second shaft 920, and the third shaft 930 are each in a respective second position. For example, the valve shaft 934 is in the second valve position. In the second valve position, the valve shaft 934 is structured to direct a fluid from the inlet portion 712 to the second channel 722 along a second flow path 904. The second shaft 920 is in a second shaft second position. The first shaft 910 is in a first shaft second position. When the lever 950 is in the third position, the springs 960, 962, 964 are each at least partially compressed. For example, when the lever 950 is in the third position (i.e., a fully closed/depressed position) the third spring 964 is fully compressed, the second spring 962 is at least partially compressed and/or is substantially more compressed compared to the lever second position, and the first spring 952 is at least partially compressed.

FIG. 28 is a side perspective view of the spray assembly of FIG. 24, shown in the third position. In some embodiments, when the first shaft 910 is actuated from the first position to the second position (e.g., by the lever 950 as described above with respect to FIG. 27), the pin 916 is structured to actuate the inner sleeve 770 from a first sleeve position to a second sleeve position by following the track portion 774. In some embodiments, the pin 916 may actuate the inner sleeve 770 from the second sleeve position to the first sleeve position when the first shaft is returned to the first shaft first position.

In some embodiments and as shown in FIG. 28, at least a portion of the first shaft 910 extends circumferentially around the radial flange 738 when the first shaft 910 is in the first shaft second position.

FIG. 29 is a detailed section view of the spray assembly of FIG. 24, shown in the third position. When the inner sleeve 770 is actuated from the first sleeve position to the second sleeve position, the inner sleeve 770 is configured to actuate the annular flange 795 of the spray face 790 such that one or more of the nozzles 791 are deflected inward towards a central axis 992 of the spray assembly 700. When directed in this manner, the nozzles 791 are configured to provide a concentrated stream spray.

Referring to FIGS. 24-29 in general, when a user releases the lever 950, the springs 960, 962, 964 will bias the first shaft 910, the second shaft 920, and the third shaft 930 back to the respective first positions, the first shaft 910 will actuate the inner sleeve 770 to the first position and the nozzles 791 will bias or return back to their original position.

As utilized herein with respect to numerical ranges, the terms "approximately," "about," "substantially," and similar terms generally mean+/−25% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. For example, the springs for actuating a plurality of internal shafts described above may be incorporated into the spray assembly of the exemplary embodiment depicted in FIG. 19. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A spray assembly comprising:

a first spray outlet configured to dispense fluid in a first spray mode;

a second spray outlet;

a spray face coupled to the second spray outlet and comprising at least one nozzle, wherein the at least one nozzle is configured to dispense the fluid in a second spray mode in a first nozzle position and in a third spray mode in a second nozzle position;

a valve configured to direct the fluid toward the first spray outlet in a first valve position and toward the second spray outlet in a second valve position; and an actuator operable between a first actuator position, a second actuator position, and a third actuator position, wherein operation of the actuator between the first actuator position and the second actuator position adjusts the valve between the first valve position and the second valve position while the at least one nozzle remains in the first nozzle position, and wherein operation of the actuator between the second actuator position and the third actuator position adjusts the at least one nozzle between the first nozzle position and the second nozzle position while the valve remains in the second valve position.

2. The spray assembly of claim 1, wherein the actuator is operable between the first actuator position and the second actuator position to move the valve relative to a first shaft between the first valve position, in which the fluid is directed toward the first spray outlet through a first passage of the first shaft, and the second valve position, in which the fluid is directed toward the second spray outlet through a second passage of the first shaft.

3. The spray assembly of claim 2, wherein:

the actuator is configured to operate the valve via a second shaft surrounding the first shaft, and the actuator is configured to operate the at least one nozzle via a sleeve surrounding the second shaft.

4. The spray assembly of claim 3, wherein:

the sleeve is configured to move relative to the second shaft between a first sleeve position and a second sleeve position in response to operation of the actuator between the second actuator position and the third actuator position, and the at least one nozzle is configured to move between the first nozzle position and the second nozzle position in response to movement of the sleeve between the first sleeve position and the second sleeve position.

5. The spray assembly of claim 4, wherein the valve is biased toward the first valve position via a first biasing member and the sleeve is biased toward the first sleeve position via a second biasing member.

6. The spray assembly of claim 5, wherein the first biasing member and the second biasing member each include a spring.

7. The spray assembly of claim 6, wherein a first spring constant of the first biasing member is smaller than a second spring constant of the second biasing member.

8. The spray assembly of claim 5, wherein the second shaft is biased via a third biasing member.

9. The spray assembly of claim 8, wherein:

the first biasing member, the second biasing member, and the third biasing member each include a spring, a first spring constant of the first biasing member is smaller than a second spring constant of the second biasing member and a third spring constant of the third biasing member, and the third spring constant is smaller than the second spring constant.

10. The spray assembly of claim 1, wherein the actuator includes a manually operable lever.

11. The spray assembly of claim 1, wherein the at least one nozzle is deflected inwardly toward a central axis of the spray assembly when the at least one nozzle is adjusted from the first nozzle position to the second nozzle position.

12. A spray assembly comprising:

a spray outlet;

a spray face coupled to the spray outlet and comprising at least one nozzle, wherein the at least one nozzle is configured to dispense fluid in a first spray mode in a first nozzle position and in a second spray mode in a second nozzle position;

a valve operable between a first valve position and a second valve position, wherein the valve allows flow of the fluid to the spray outlet in the second valve position, and wherein the valve is biased to the first valve position via a first biasing member;

a sleeve operably coupled to the at least one nozzle, wherein the sleeve is movable between a first sleeve position associated with the first nozzle position of the at least one nozzle and a second sleeve position associated with the second nozzle position of the at least one nozzle, and wherein the sleeve is biased to the first sleeve position via a second biasing member;

an actuator operable between a first actuator position, a second actuator position, and a third actuator position, wherein operation of the actuator between the first actuator position and the second actuator position adjusts the valve to the second valve position, wherein operation of the actuator between the second actuator position and the third actuator position adjusts the sleeve to the first sleeve position, and wherein the first biasing member has a different resistance from the second biasing member.

13. The spray assembly of claim 12, wherein the first biasing member and the second biasing member each include a spring, and wherein the springs have different spring constants.

14. The spray assembly of claim 13, wherein a first spring constant of the first biasing member is smaller than a second spring constant of the second biasing member.

15. The spray assembly of claim 12, wherein the different resistances of the first biasing member and the second biasing member are configured to provide tactile feedback to a user as the user operates the actuator between the first actuator position, the second actuator position, and the third actuator position.

16. The spray assembly of claim 12, wherein the actuator includes a manually operable lever.

17. The spray assembly of claim 12, wherein:

the actuator is configured to operate the valve via a shaft surrounded by the sleeve, movement of the shaft is controlled via a third biasing member configured to apply a biasing force on the shaft, and the third biasing member has a different resistance from the first biasing member and the second biasing member.

18. A spray assembly comprising:

a spray outlet;

a spray face coupled to the spray outlet and comprising at least one nozzle, wherein the at least one nozzle is configured to dispense fluid in a first spray mode in a first nozzle position and in a second spray mode in a second nozzle position;

a valve operable between a first valve position and a second valve position, wherein the valve allows flow of the fluid to the spray outlet in the second valve position;

a shaft surrounding the valve and configured to adjust the valve between the first valve position and the second valve position;

a sleeve surrounding the shaft and configured to move the at least one nozzle between the first nozzle position and the second nozzle position, wherein the at least one nozzle is deflected inwardly toward a central axis of the spray assembly when the at least one nozzle is adjusted from the first nozzle position to the second nozzle position; and an actuator operable between a first actuator position, a second actuator position, and a third actuator position, wherein operation of the actuator between the first actuator position and the second actuator position causes the shaft to adjust the valve between the first valve position and the second valve position, and wherein operation of the actuator between the second actuator position and the third actuator position causes the sleeve to move the at least one nozzle between the first nozzle position and the second nozzle position.

19. The spray assembly of claim 18, wherein:

the shaft is movable relative to the valve via operation of the actuator between the first actuator position and the second actuator position and movement of the shaft is controlled via a first biasing member, and the sleeve is movable relative to the shaft via operation of the actuator between the second actuator position and the third actuator position and movement of the sleeve is controlled via a second biasing member.

20. The spray assembly of claim 19, wherein the first biasing member and the second biasing member are springs having different spring constants.

* * * * *